US012588695B2

(12) United States Patent (10) Patent No.: US 12,588,695 B2
Perlman (45) Date of Patent: Mar. 31, 2026

(54) SALT CARRIER COMPOSITIONS FOR PREPARING LOW FAT, LOW CALORIE AND LOW SODIUM MICROWAVE POPCORN

(71) Applicant: Daniel Perlman, Arlington, MA (US)

(72) Inventor: Daniel Perlman, Arlington, MA (US)

( * ) Notice: Subject to any disclaimer, the term of this patent is extended or adjusted under 35 U.S.C. 154(b) by 0 days.

(21) Appl. No.: 19/282,101

(22) Filed: Jul. 28, 2025

(65) Prior Publication Data

US 2025/0351851 A1 Nov. 20, 2025

Related U.S. Application Data

(63) Continuation-in-part of application No. PCT/US2024/053166, filed on Oct. 28, 2024, which is a continuation-in-part of application No. 18/439,245, filed on Feb. 12, 2024.

(51) Int. Cl.
*A23L 7/183* (2016.01)
*A23L 27/10* (2016.01)
*A23L 29/00* (2016.01)

(52) U.S. Cl.
CPC ............. *A23L 7/183* (2016.08); *A23L 27/105* (2016.08); *A23L 29/015* (2016.08); *A23L 29/04* (2016.08)

(58) Field of Classification Search
CPC ........ A23L 7/183; A23L 27/105; A23L 29/04; A23L 29/015
USPC ........................................................ 426/455
See application file for complete search history.

(56) References Cited

U.S. PATENT DOCUMENTS

| | | | |
|---|---|---|---|
| 3,704,133 A | 11/1972 | Kracauer |
| 4,560,574 A | 12/1985 | Meyer |
| 4,716,061 A | 12/1987 | Winter |
| 4,767,635 A | 8/1988 | Merritt et al. |

(Continued)

FOREIGN PATENT DOCUMENTS

| | | |
|---|---|---|
| CA | 1323796 C | 11/1993 |
| CA | 2777221 A1 | 4/2011 |

(Continued)

OTHER PUBLICATIONS

Ellie, (Healthy Microwave Popcorn) https://nashvillewife.com/healthy-microwave-popcorn/ (Year: 2015).

(Continued)

*Primary Examiner* — Brent T O'Hern
(74) *Attorney, Agent, or Firm* — ARRIGO, LEE, GUTTMAN & MOUTA-BELLUM LLP

(57) ABSTRACT

The invention relates to the discovery of alternative carriers for adhesion of salt and flavors to popcorn during microwave popping to replace the typical unhealthy solid fat carriers, such as palm oil. Unexpectedly, water can be used as a carrier instead of fats to adhere salt and flavors to the popcorn during microwave popping. Also unexpectedly, MCT oil can be used in both high and extremely low amounts to adhere high levels of salt and flavors to the popcorn kernels during microwave popping without causing burning or scorching. Thus, MCT oil can be used to replace solid fat carriers, such as palm oil, and create a healthier popcorn, not only by replacing the palm oil with a healthier salt carrier, but also by providing a salt carrier having a lower fat content capable of providing higher salt adhesion.

19 Claims, 2 Drawing Sheets

MCT Oil(g)

(56)                    References Cited

U.S. PATENT DOCUMENTS

| | | | |
|---|---|---|---|
| 5,284,666 A | 2/1994 | Graf | |
| 5,443,858 A | 8/1995 | Jensen et al. | |
| 5,585,127 A | 12/1996 | Freeport et al. | |
| 5,690,979 A | 11/1997 | Bourns et al. | |
| 5,747,080 A | 5/1998 | Lemke | |
| 5,750,166 A | 5/1998 | Schellhaass | |
| 5,753,287 A | 5/1998 | Chedid et al. | |
| 5,897,894 A | 4/1999 | Glass | |
| 5,994,685 A | 11/1999 | Jackson et al. | |
| 6,013,291 A * | 1/2000 | Glass | A23P 20/18 |
| | | | 426/627 |
| 6,706,296 B2 | 3/2004 | Dickerson et al. | |
| 8,057,837 B2 | 11/2011 | Plank et al. | |
| 8,729,437 B2 | 5/2014 | Gorman et al. | |
| 10,743,569 B2 | 8/2020 | Galcerán | |
| 11,407,577 B1 | 8/2022 | Watkins | |
| 2003/0012853 A1 | 1/2003 | Jensen et al. | |
| 2006/0088648 A1 | 4/2006 | Teoh et al. | |
| 2012/0164282 A1* | 6/2012 | Peterson | A23L 7/191 |
| | | | 426/107 |
| 2022/0096584 A1 | 3/2022 | Randel | |
| 2023/0248041 A1 | 8/2023 | Han et al. | |
| 2025/0255327 A1 | 8/2025 | Perlman | |

FOREIGN PATENT DOCUMENTS

| | | | |
|---|---|---|---|
| CN | 104171972 A | 12/2014 | |
| CN | 107647104 A | 2/2018 | |
| DE | 102005034232 A1 | 1/2007 | |
| EP | 1453386 A4 | 12/2005 | |
| EP | 2502504 A1 | 9/2012 | |
| EP | 2674040 A1 | 12/2013 | |
| KR | 101267093 B1 | 5/2013 | |
| RU | 2402237 C2 | 10/2010 | |
| WO | 9501105 A1 | 1/1995 | |
| WO | 00/33668 A1 | 6/2000 | |
| WO | 03/080465 A1 | 10/2003 | |
| WO | 2005/090200 A1 | 9/2005 | |
| WO | 2006/004906 A2 | 1/2006 | |
| WO | 2011/003011 A1 | 1/2011 | |
| WO | 2011/044189 A1 | 4/2011 | |
| WO | 2011/044193 A1 | 4/2011 | |
| WO | 2015/116804 A1 | 8/2015 | |
| WO | 2023/044169 A2 | 3/2023 | |
| WO | 2023/107160 A1 | 6/2023 | |
| WO | 2025/174425 A1 | 8/2025 | |

OTHER PUBLICATIONS

Phipps, (Coconut Oil Stovetop Popcorn) https://www. milkandhoneynutrition.com/recipes/coconut-oil-stovetop-popcorn/ (Year: 2016).

Bjarnadottir (What's the Difference Between MCT Oil and Coconut Oil?) https://www.healthline.com/nutrition/mct-oil-vs-coconut-oil ( Year: 2019).

Shah and Limketkai in Practical Gastroenterology (2017), The Use of Medium-Chain Triglycerides in Gastrointestinal Disorders, 160, 20-28.

Boateng et al., Coconut oil and palm oil's role in nutrition, health and national development: A review in Ghana Med J (2016) vol. 50 Number, Sep. 3, 2016, 189-196.

Park ET Park et al., Physicochemical properties and volatile formation mechanism of medium-chain triacylglycerols during heatingJ. Food Sci. 2022;87:2616-2625.

Formeller, Unpopular opinion Burnt popcorn is good [Online], published Oct. 18, 2021, [retrieved on Apr. 14, 2025]. Retrieved from the Internet: <URL: https://northernstar. info/88626/opinion/ unpopular-opinion-burnt-popcorn-is-good/> (Year: 2021).

Bryan, Microwave popcorn [Online], published as late as May 21, 2023, [retrieved on Oct. 25, 2024]. Retrieved from the Internet: <URL: https://downshiftology.com/recipes/microwave-popcorn/> (Year: 2023).

European Patent Office, International Search Report of PCT/US2024/ 053166, Feb. 4, 2025. 1-4.

European Patent Office, Written Opinion of PCT/US2024/053166, Feb. 4, 2025. 1-5.

Database GNPD global new product d, [Online] Minitel, Feb. 1, 2021 (Feb. 1, 2021), Anonymous: "organic salted popcorn", XP093242753, Database accession No. 8525153, 1-2.

Okeke "Microwave heating applications in food processing", IOSR-JEEE, 2014, 9(4), pp. 29-34 (Year: 2014).

Unknown Author, "MCT Oil 3585/3595 Safety Data Sheet", published on Nov. 6, 2013, retrieved on Aug. 8, 2024 from the Internet: <URL: https:// https://www.flavorwest.com/media/catalog/producUm/ c/mct_oil_fw-mct_2. pdf > (Year: 2013).

Thili, "Difference Between MCT Oil and Coconut Oil" [Online], published Jun. 16, 2016, [retrieved on Aug. 8, 2024]. Retrieved from the Internet: <URL: https:// https://www.differencebetween.com/ difference-between-mct-oil-and-vs-coconut-oil/> (Year: 2016).

Van Der Sman, Journal of Food Engineering 211 (2017) 69e84, Critical factors in microwave expansion of starchy snacks.

Hasanah and Warnasih, AIP Conf. Proc. 2243, 020007 (2020), Synthesis and characterization of medium-chain triglyceride (MCT) from virgin coconut oil (VCO).

Dealler et al., Nature, vol. 344, Apr. 5, 1990, 496, Superficial Microwave Heating.

Virot and Ponomarenko, J. R. Soc. Interface 12: 20141247, Popcorn: critical temperature, jump and sound.

Unknown Author, The Ultimate Guide to MCT Oil (https://www. eatiqbar.com/blogs/news/the-ultimate-guide-to-mct-oil#).

Gokmen et al., Journal of Food Engineering 65 (2004) 357-62, Effects of moisture content and popping method on popping characteristics of popcorn.

Wikipedia, Template :Smoke point of cooking oils, https://en. wikipedia.org/wiki/Template: Smoke_point_of_cooking_oils.

USPTO, Office Actions in U.S. Appl. No. 18/439,245, filed Feb. 12, 2024.

Nimbkar et al., Medium chain triglycerides (MCT): State-of-the-art on chemistry, synthesis, health benefits and applications in food industry, Compr Rev Food Sci Food Saf. 2022;1-25.

* cited by examiner

MCT Oil(g)

SALT CARRIER COMPOSITIONS FOR PREPARING LOW FAT, LOW CALORIE AND LOW SODIUM MICROWAVE POPCORN

CROSS-REFERENCE TO RELATED APPLICATIONS

This application is a continuation-in-part of U.S. application Ser. No. 18/439,245 filed on Feb. 12, 2024, and a continuation-in-part of International Application PCT/US2024/053166 filed on Oct. 28, 2024, both of which are incorporated herein by reference in their entirety.

BACKGROUND OF THE INVENTION

Salted popcorn is and has been enjoyed by countless millions of people worldwide for many decades. Without added salt, the flavor of popcorn is rather bland. Fats such as butterfat and a variety of vegetable oils such as canola oil or corn oil may be added to the popcorn before or after popping, but unless these fats contain added salt, the popcorn's taste remains bland. Tumbling or spraying freshly popped warm popcorn with melted butter, or vegetable oil, or even a water mist will help subsequently added dry table salt (NaCl) adhere to the popped kernels of popcorn. However, a coating of oil adds generally unwanted calories to a serving of popcorn while a coating of moisture diminishes the desirable crispness of freshly popped popcorn. In the absence of either an oil or a water mist coating, a typically small and unpredictable portion of added table salt sticks to freshly popped popcorn. Moreover, the added salt is generally non-uniformly distributed among the popped kernels. The fine-milling of table salt to produce so-called "popcorn salt" (sold by Morton Salt, Inc. and other companies) may modestly increase salt retention by popped kernels, but a controlled study and comparison with regular table salt has not been found. It would be desirable to find a convenient and better means of introducing a predictable and uniformly distributed amount of salt onto or into popped popcorn kernels. Depending upon taste preferences, and/or desire to limit one's daily sodium intake, a person may wish to limit the amount of added table salt to between, for example, 0.2 g and 0.6 g per ounce of popped popcorn. For the purpose of limiting dietary sodium intake, supplemental salty taste may be provided by adding or substituting potassium chloride for a portion of the sodium chloride. Furthermore, based upon taste preferences, it is common for individuals to add other food ingredients to the popped kernels including, for example, powdered cheeses, savory flavorings or sweetening ingredients such as melted caramel.

In commercial microwave popcorn, liquid fats have been avoided. Instead, commercial microwave popcorn is typically packaged in pre-loaded microwaveable bags in which the unpopped kernels, aka "virgin popcorn kernels," abbreviated "V-PCKs") are combined with substantial amounts of high calorie solid saturated fat, e.g., palm oil, to prevent rancidity along with substantial amounts of salt and flavorings. The saturated fat, e.g., palm oil, that is solid at room temperature, localizes most of the kernels near the center of the microwave bag/vessel and is also used as a carrier material for the salt and flavors. The saturated fat melts during microwave irradiation and is absorbed by the puffs of popped kernels, thereby delivering the salt into the kernels. While a saturated fat such as palm oil is slow to become rancid and develop off-flavors, it tends to be cholesterolemic. Palm fat may be considered undesirable because it contains high levels (44% by weight) of the saturated fatty acid, palmitic acid, known to be cholesterolemic, i.e., raises blood levels of LDL and total cholesterol, thereby possibly increasing the risk of cardiovascular diseases.

The presence of these fats can be seen on the "Nutrition Facts" labels on various commercial microwave popcorn products. For example, a serving (35 g) of ORVILLE REDENBACKER's "NATURALS, SIMPLY SALTED" MICROWAVE POPCORN contains 5 g of saturated fat and 11 g of total fat. A serving (34 g) of ORVILLE REDENBACKER's "KETTLE CORN" MICROWAVE POPCORN contains 4 g of saturated fat and 8 g of total fat. A serving (42 g) of ORVILLE REDENBACKER's "LIGHT BUTTER" MICROWAVE POPCORN contains 2.5 g of saturated fat and 6 g of total fat. A serving (37 g) of ORVILLE REDENBACKER's "SMART POP! BUTTER, 94% FAT-FREE," MICROWAVE POPCORN contains 0.5 g of saturated fat and 2 g of total fat. On the ingredient label, palm oil is the added fat and it contains 50% by weight saturated fat. From the available information, the latter popcorn product contains between 0.5 g-0.75 g of saturated fat and 1-1.5 g of added palm oil per 37 g serving. Upon opening a bag of this product, the palm oil was found to be heterogeneously distributed, coagulated to only to a small portion of the V-PCKs.

With regard to labeling regulations, the FDA provides rounding rules for Nutrition Facts labels. For fats, <0.5 g is rounded to zero, whereas, <5 g is rounded to the nearest 0.5 g. With regard to salts, by comparing the sodium content on these "Nutrition Facts" labels for the various unpopped and popped popcorn products containing differing amounts of fats, a large variability of salt retention can be seen in the amount of salt that actually sticks to the popcorn (reported for 1 cup of popped kernels). For example, the lowest retentions are 44% and 48% for "Smart Pop! 94% Fat-Free" and "Smart Pop!Butter, 94% Fat-Free respectively (with the lowest total fat contents at 2 g per serving) and the highest are 98% for both "Sea Salt" Microwave Popcorn and "Kettle Corn" Microwave Popcorn (with 2 to 4-fold higher fat contents at 4.5 g and 8 g fat per serving respectively).

When microwavable popcorn was first introduced into the market, it experienced poor popping yield while some popped kernels burned. Many of these problems have been resolved—often via packaging or coating solutions. van der Sman, Journal of Food Engineering 211 (2017) 69-84. Nevertheless, as anyone who has microwaved popcorn can attest, microwaving of popcorn for too long an interval causes popcorn burning. Thus, burning of popcorn is a major concern when kernels are popped in the microwave. Concentrated aqueous salt solutions can become extremely hot when subjected to microwave radiation due to the electrical conductivity of these solutions and the rapid motion of chloride anions. Salt or other ions increase the dielectric loss factor of the coating and can provide an increase of surface temperature. Van der Sman.

Moreover, poor penetration of microwaves into food with high ionic concentrations may result from the induction of electrical/ionic flow in the surface of the food and may explain why commercial food heated in microwaves commonly boils on the surface but is cool on the inside. Dealler et al., Nature, Vol, 344, 496. Consequently, it is expected that the addition of salt will increase the temperature of the exterior surface of popcorn during microwaving. In addition, oil enhances the risk of burning of popcorn at high microwave power and low moisture content. Van der Sman.

In order to "pop," popcorn kernels must reach a temperature of about 180° C./356° F. Virot and Ponomarenko, J. R. Soc. Interface 12: 20141247. The smoke point of an oil is the temperature at which the oil begins to smoke and char. Park et al., J. Food Sci. 2022; 87:2616-2625. The smoke point is the temperature at which a fat or oil produces a continuous wisp of smoke and is a useful indicator of an oil or fat's suitability for frying. Boateng et al., Ghana Med J 2016; 50(3): 189-196. In other words, an oil should not be used at a temperature above its smoke point.

Conventional cooking oils have the following high smoke points (Wikipedia—Template: Smoke point of cooking oils):

butter (clarified) 482° F.
   canola oil (refined) 400° F.
   corn oil (refined) 446-460° F.
   cottonseed oil (refined, bleached, deodorized) 428-446° F.
   peanut oil (refined) 450° F.
   safflower (refined) 510° F.
   soybean oil 453° F.
   sunflower (neutralized, dewaxed, bleached & deodorized) 486-489° F.
   coconut oil (refined) 400° F.
   palm oil (fractionated) 455° F.

All of these oils have a smoke point that is substantially higher than the temperature at which popcorn pops (i.e., ~356° F.).

In contrast, the smoke point of MCT oil is between 284° F. and 320° F. Park et al. Thus, the smoke point of MCT oil is much lower than that of these conventional cooking oils. In fact, MCT oil has a smoke point (284° F. and 320° F.) that is considerably lower than the temperature at which popcorn pops (i.e., ~356° F.). As explained in US20120164282 (¶[0070]), one "should minimize the presence of those ingredients that cause undesirable browning or burning at the high temperatures 160-170° C. characteristic of microwave popcorn popping." MCT oil would have been expected to be just such an ingredient.

It is well known that the low smoke point of MCT oil makes it contraindicated for high temperature cooking. For example, Park et al. states, "MCTs may not be used for high-temperature cooking procedures, such as deep-fat frying or pan frying, due to the low smoke point of approximately 140-160° C., which is significantly lower than the range of 190-240° C. of other conventional edible oils." Park et al. at 2617. Moreover, in Table 4 on page 25, Shah and Limketkai, Practical Gastroenterology February 2017 at indicates: "Do not heat MCT oil over 150° C. (302° F.); otherwise it will affect the flavor of the food." Similarly, The Ultimate Guide to MCT Oil (eatiqbar.com/blogs/news/the-ultimate-guide-to-mct-oil#) notes, "MCT oil has a low smoke point, so avoid heating it on the stove or in the microwave." Thus, MCT oil is an oil that is contraindicated for cooking above its smoke point, and one would not have considered MCT oil as suitable for popping of popcorn in a microwave.

Moreover, the thickness of the pericarp (i.e., hull) of popcorn kernels is only about 160 μm. See Virot and Ponomarenko. In contrast, the average kernel diameter is more than thirty times greater (~6 mm). Virot and Ponomarenko. In Gokmen et al., the heating of popcorn in a microwave as compared to stovetop heating was described as follows, "However, the maximum flake size, in contrast, was obtained with microwave popping. This may be because electromagnetic waves quickly and simultaneously transfer the heat to every part of the kernel and internal pressure of the kernel for popping is achieved in a short time." Journal of Food Engineering 65 (2004). Thus, one would expect that, when heating popcorn, the whole kernel heats quite evenly. Based on the very thin pericarp relative to the thickness of the kernel, one would expect that the temperature on the inside and outside of the kernel to also rapidly equilibrate.

Thus, one would have also expected that, if MCT oil were used to cook popcorn in a microwave, any MCT oil on the outside of those kernels would smoke as it passed its smoke point before the popcorn kernels popped. Such smoking would be extremely undesirable, as it would be expected to cause undesirable browning or burning of the popped popcorn. Based on its low smoke point, one would not have expected that MCT oil could be used successfully to cook popcorn without producing this undesirable browning or burning.

Thus, there is a need in the art for healthier microwave popcorn options and compositions not containing palm oil and other cholesterolemic oils such as palm kernel oil and coconut oil, while also providing sufficient salting. The present invention fulfills this need.

SUMMARY OF THE INVENTION

The present invention provides compositions, methods of making, and methods of packaging and using compositions comprising V-PCKs, MCT oil, and a salt, or alternatively V-PCKs and a saline solution. The composition can be used to make a heathy and tasty popcorn snack.

The invention encompasses a composition comprising:
   a) at least 70% V-PCKs by weight;
   b) 1-28% MCT oil by weight; and
   c) 0.5-4% salt by weight at a weight ratio of salt:MCT oil from 1:16 to 4:1; wherein the composition contains at least 97% of V-PCKs, MCT oil, and salt.

In some embodiments, the composition consists of V-PCKs, MCT oil, and salt.

In some embodiments, the composition contains at least 98% of V-PCKs, MCT oil, and salt.

In some embodiments, the composition contains at least 99% of V-PCKs, MCT oil, and salt.

In some embodiments, the composition comprises:
   a) 70-80% V-PCKs by weight;
   b) 14-28% MCT oil by weight; and
   c) 0.5-4% salt by weight at a weight ratio of salt:MCT oil from 1:16 to 4:1; and contains at least 98% of these three components.

In some embodiments, the composition comprises:
   a) 80-90% V-PCKs by weight;
   b) 4-18% MCT oil by weight; and
   c) 0.5-4% salt by weight at a weight ratio of salt:MCT oil from 1:16 to 4:1; and contains at least 98% of these three components.

In some embodiments, the composition comprises:
   a) 75-85% V-PCKs by weight;
   b) 9-14% MCT oil by weight; and
   c) 0.5-4% salt by weight at a weight ratio of salt:MCT oil from 1:16 to 4:1; and contains at least 98% of these three components.

In some embodiments, the composition comprises:
   a) 90-95% V-PCKs by weight;
   b) 0.5-4.5% MCT oil by weight; and
   c) 0.5-4% salt by weight at a weight ratio of salt:MCT oil from 1:16 to 4:1; and contains at least 98% of these three components.

In some embodiments, the salt is sodium chloride (NaCl). In some embodiments, the salt is mixture of potassium chloride (KCl) and sodium chloride (NaCl). In some embodiments, the salt is a 1:1 mixture by weight of KCl and NaCl.

In some embodiments, the composition comprises 0.5-2% salt by weight.

In some embodiments, the composition comprises 2-4% salt by weight.

In some embodiments, the composition comprises 0.5-4% MCT oil by weight.

In some embodiments, the composition comprises 1-6% MCT oil by weight.

In some embodiments, the e composition comprises 6-28% MCT oil by weight.

In some embodiments, the composition further comprises a flavoring.

In some embodiments, the composition further comprises a thickener.

In some embodiments, the composition is in a microwave popcorn popping bag.

The invention encompasses a method of popping virgin popcorn kernels (V-PCKs) to make a popcorn snack without burning comprising providing a composition of the invention, and subjecting the composition to microwave radiation for 2 to 4 minutes to pop the V-PCKs.

DETAILED DESCRIPTION OF THE INVENTION

Figure 1:
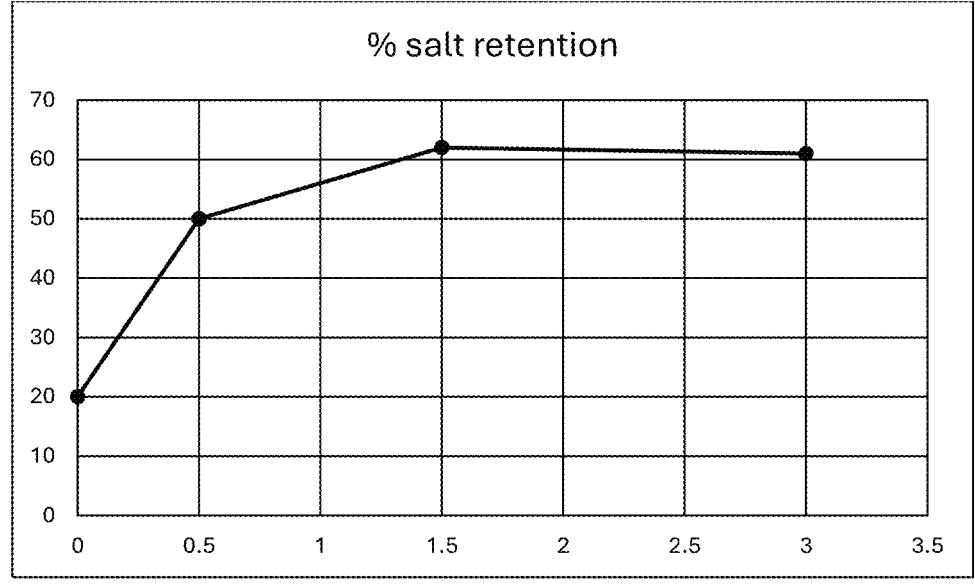
FIG. 1. depicts the increasing retention of salt with increasing amounts of MCT oil applied to popcorn kernels for salt particles ground to a particle size of between 200 and 300 microns by mortar and pestle.

The invention relates to the discovery of alternative carriers for adhesion of salt and flavors to popcorn during microwave popping to replace the typical unhealthy solid fat carriers, such as palm oil. A two-pronged strategy was pursued for transferring salt into popcorn during the popping process in which one hydrophilic aqueous carrier for salt and one hydrophobic MCT carrier for salt were tested.

Unexpectedly, water can be used as a carrier instead of fats to adhere salt and flavors to the popcorn during microwave popping.

Also unexpectedly, MCT oil can be used in extremely low amounts to uniformly coat virgin popcorn kernels (V-PCKs) and adhere high levels of salt, especially small salt particles, such as 60 mesh, 125 mesh and 200 mesh NaCl and/or KCl powders and can surprisingly be used without scorching or burning of the popcorn during microwave popping. Flaked and powdered flavors and sweeteners can similarly be adhered to the popcorn kernels prior to microwave popping. Furthermore, MCT oil can be used to make oil-salt slurries that conveniently coat V-PCKs in a single step. Accordingly, salted MCT coatings or oil-salt slurries can replace solid fat carriers such as palm oil to create healthier microwave popcorn products. At the same time these coatings contain less oil and therefore fewer calories, while also being capable of greater salt adhesion. Moreover, the MCT/salt/ V-PCK compositions can be stored for extended periods of time (e.g., greater than a year) without compromising the ability of the popcorn kernels to pop.

Unexpectedly, a very low level of MCT oil (e.g., 0.45 g-0.75 g of MCT oil) can be used that is significantly less than the levels of palm oil used in current low-fat commercial products (e.g., 1 g-1.5 g of added palm oil per approximate 30 g serving) without scorching or burning of the popcorn during microwave popping. Applicant has successfully used quantities of less than 1.0 g of MCT oil for 56 g (i.e., two servings) of V-PCKs. This corresponds to less than 0.5 g of MCT oil per serving of V-PCKs, and is far lower than the levels of palm oil being used in low-fat commercial microwave popcorn products. The latter products contain 1 g-1.5 g of added palm oil per serving. By comparison, levels of fat in ordinary commercial microwave popcorn products contain far higher levels of palm oil. While MCT oil is considered a nutritionally beneficial and healthful oil, it is still, by chemical definition, a saturated fat. Interestingly though, by FDA nutritional labeling "rounding" rules, a level of MCT oil of 0.45 g per serving rounds down to 0 g saturated fat. This compares favorably with the higher levels of saturated fat found in the amounts of palm oil currently being incorporated in low-fat commercial products (>0.5 g-0.75 g of saturated per serving).

Thus, the present invention provides microwave popcorn with lower levels of total fat, lower levels of saturated fat, higher salt retention at low fat levels, and a non-cholesterolemic fat that tends to be rapidly metabolized for energy in the human body. Moreover, the MCT oil provides a homogenous and beneficially thin oil coating of the V-PCKs compared to a saturated fat that is solid at room temperature such as palm oil.

V-PCKs+MCT Oil+Salt Compositions

The invention encompasses a composition comprising V-PCKs, MCT oil and a salt, as well as methods of making, storing, and using these compositions. Any and all compositions that can be derived by combining any and all the disclosed percentages of V-PCKs, MCT oil and salt are envisioned. The percentages recited herein are all weight percentages.

In various embodiments, the composition comprises or consist of at least 75%, 80%, 85%, 90%, 91%, 92%, 93%, 94%, 95%, 96%, 97%, 98% or 99% V-PCKs or any range between these percentages (e.g., 92-95% or 90-94%). Preferably, the composition comprises from 90-95% V-PCKs, most preferably from 93-95% V-PCKs.

Virgin popcorn kernels (V-CPKs) can be from any source, including both yellow and white kernel varieties. Exemplary V-PCKs re those found in commercially available products from BOB's RED MILL NATURAL FOODS, INC., YODER POPCORN LLC, and CONAGRA BRANDS, INC.

In various embodiments, the composition comprises or consists of at least 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 15%, 20%, 25%, 30% or 35% of MCT oil, or any range between these percentages. Preferably, the composition comprises 0.5-6% MCT oil, preferably, 1-4% MCT oil or 1-3% MCT oil, most preferably 1-2% MCT oil.

In various embodiments, the esterified fatty acid chains of MCT oil are at least 50%, 55%, 65%, 70%, 75% 80%, 85%, 90%, or 95% C8:0 (Caprylic acid) and/or C10:0 (Capric acid) by weight of the esterified fatty acid chains of the MCT oil. Preferably, the esterified fatty acid chains of the MCT oil are at least 75% C8:0 (Caprylic acid) and/or C10:0 (Capric acid), most preferably at least 95% C8:0 (Caprylic acid) and/or C10:0 (Capric acid) by weight of the esterified fatty acid chains of the MCT oil.

MCT oils, including the presently described Neobee® M-5 oil, are known to be excellent solvents and carriers for flavors, and are used for this purpose in bakery products and in candy making for example. The oxidative stability and resistance of MCT oils to elevated temperatures is beneficial in the present microwave application as well as for extending the shelf life of commercial microwave popcorn products in which popcorn kernels are packaged together with MCT oil, salts, sweeteners, and flavorings. Therefore, it is evident that MCT oils will be well suited to be flavor carriers in preparing flavored microwave popcorn during which the MCT oil experiences elevated temperatures during microwave irradiation.

In various embodiments, the composition comprises or consists of at least 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, or 6.0% salt, or any range between these percentages. Preferably, the composition comprises 0.5-4% salt, more preferably, 1-4% salt, most preferably 2-4% salt.

The salt can be any edible salt or salt mixture that adds a salty flavor to the popped PCKs. In one embodiment, the salt is NaCl.

In various embodiments, the particle size of the salt is less than 500, 400, 300, 250, 200, 175, 150, 125, 100, 75, 60, 50, or 40 microns in size, or any range between these numbers. In a preferred embodiment, the particle size of the salt is under 125 microns.

In various embodiments, the composition comprises or consists of at least 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, or 3.0% sodium, or any range between these percentages. Preferably, the composition comprises 0.25-2% sodium, more preferably, 0.5-2% sodium, most preferably 0.6-1.5% sodium.

In one embodiment, the salt is mixture of KCl and NaCl. In various embodiment, the salt is a 2:1, 3:2, 1:1, 2:3, or 1:2 mixture of KCl and NaCl. In one embodiment, the composition comprises 1.5-4% salt.

In various embodiments, the composition comprises at least 90% V-PCKs; 0.5-5%, 1-4%, 0.5%-3%, or 0.5-6% MCT oil; and 0.5-4% salt. In one embodiment, the composition comprises 1-2% MCT oil, 1-4% salt, and at least at least 92%, 92%, 93%, 94% or 95% V-PCKs. In one embodiment, the composition comprises 1-3% MCT oil, 1-4% salt, and at least 92%, 92%, 93%, 94% or 95% V-PCKs. In one embodiment, the composition comprises 0.5-3% MCT oil, 1-4% salt, and at least 92%, 92%, 93%, 94% or 95% V-PCKs. In one embodiment, the composition comprises 0.5-2% MCT oil, 1-4% salt, and at least 92%, 92%, 93%, 94% or 95% V-PCKs. In various embodiments, the composition comprises 90%-95% V-PCKs; 0.5-6% MCT oil; and 0.5-4% salt. In one embodiment, the composition comprises 0.5-2% MCT oil, 1-4% salt, and at least 92%, 92%, 93%, 94% or 95% V-PCKs. In one embodiment, the composition comprises 0.5-1.5% MCT oil, 2-4% salt, and at least 92%, 92%, 93%, 94% or 95% V-PCKs.

In one embodiment, the composition consists or consists essentially of MCT oil, salt, and V-PCKs. In one embodiment, the composition consists or consists essentially of 0.5-1.5% MCT oil, 2-4% salt, and 94.5-97.5% V-PCKs. In one embodiment, the composition consists or consists essentially of 0.5-3% MCT oil, 1-4% salt, and 93-98.5% V-PCKs. In one embodiment, the composition consists or consists essentially of 3-6% MCT oil, 1-4% salt, and 90-96% V-PCKs. In one embodiment, the composition consists or consists essentially of 6-10% MCT oil, 1-4% salt, and 86-93% V-PCKs. In one embodiment, the composition consists or consists essentially of 10-20% MCT oil, 1-4% salt, and 86-93% V-PCKs.

In one embodiment, the composition consists of MCT oil, salt, V-PCKs, and flavoring(s). In one embodiment, the composition consists of 0.5-1.5% MCT oil, 2-4% salt, and 94.5-97.5% V-PCKs and flavoring(s).

The flavoring(s) and V-PCKs can be in a ratio at least 1:3, 1:4, 1:5, 1:6, 1:7, 1:8, 1:9, 1:10, 1:20, 1:30, 1:40, 1:50, 1:60, 1:70, 1:80, 1:90, or 1:100 (flavoring(s):V-PCKs).

In one embodiment, the composition consists of 0.5-3% MCT oil, 1-4% salt, and 93-98.5% V-PCKs and flavoring(s). For example, the composition can consist of 2% MCT oil, 2% salt, 95% V-PCKs, and 1% flavoring(s).

In one embodiment, the composition consists of 3-6% MCT oil, 1-4% salt, and 90-96% V-PCKs and flavoring(s). For example, the composition can consist of 5% MCT oil, 1.5% salt, 93% V-PCKs, and 0.5% flavoring(s).

In one embodiment, the composition consists of 6-10% MCT oil, 1-4% salt, and 86-93% V-PCKs and flavoring(s). For example, the composition can consist of 10% MCT oil, 2% salt, 87% V-PCKs, and 1% flavoring(s).

In one embodiment, the composition consists of 10-20% MCT oil, 1-4% salt, and 76-93% V-PCKs and flavoring(s). For example, the composition can consist of 20% MCT oil, 2% salt, 77% V-PCKs, and 1% flavoring(s).

In some embodiments, a thickener is added to increase the contact of the MCT oil/salt with the V-PCK. A fat-based thickener can be used to solidify an otherwise fluid MCT oil.

An example of a suitable palm fat thickener includes PALMES 63 having a melting point of approximately 143° F. with a solid fat content of greater than 80% at 100° F., (Product Code FM-0068, Fuji Vegetable Oil, Inc., Savannah, GA). Another example of suitable MCT oil thickener includes glyceryl monostearate such as Drewmulse 200K FLAKE obtained from the Stepan Company (Northbrook, IL) that can be added and melted together with the slurry at a level of between 10-15% by weight.

In some embodiments, the composition comprises 0.1-0.5%, 0.5-1%, 1-2% or 2-3% of a thickener.

Preferably, the composition does not contain any heat tolerant glaze forming carbohydrate ingredient, such as isomalt.

In some embodiments, the ratio of salt:MCT oil is from 1:16 to a 4:1 by weight. In some embodiments, the ratio of salt:MCT oil is from 1:16 to 1:8, from 1:8 to 1:4, from 1:4 to 1:2, from 1:2 to 1:1, from 1:1 to 2:1, from 2:1 to 4:1, from 1:16 to 1:1:4, from 1:8 to 1:2, from 1:4 to 1:1, from 1:2 to 2:1, or any combinations within these ratios.

In some embodiments, the ratio of popcorn:MCT oil is from 112:1 to a 3.5:1 by weight. In some embodiments, the ratio of popcorn:MCT oil is from 112:1 to 56:1, from 56:1 to 23:1, from 23:1 to 11:1, from 11:1 to 5.5:1, or from 5.5:1 to 3.5:1, or any combinations within these ratios.

Preferably, the V-PCKs are homogeneously coated with an MCT oil/salt slurry.

In one embodiment, the composition further comprises a flavoring. The flavoring can be a garlic flavoring and onion flavoring.

In some embodiments the flavoring is a sweetener, preferably *Stevia rebaudiana*.

In some embodiments the flavoring is caramel, cinnamon, pepper (including cayenne), chili powder, rosemary, thyme, chicken, or beef.

In some embodiments, the flavoring is extracted into the MCT oil. Thus, the invention encompasses a method comprising extracting a flavoring into an MCT oil and coating V-PCKs with the oil.

In some embodiments, the composition comprising V-PCKs, MCT oil, and a salt contains at least 80%, 81%, 82%, 83%, 84%, 85%, 86%, 87%, 88%, 89%, 90%, 91%, 92%, 93%, 94%, 95%, 96%, 97%, 98%, 99%, or even 100% of these three components, for example, 92% V-PCKs, 6% MCT oil, and 2% salt (100%) or 92% V-PCKs, 3% MCT oil, and 1.5% salt (96.5%).

In some embodiments, the composition comprising V-PCKs, MCT oil, and a salt contains at least 97%, 98%, 99%, or even 100% of these three components, for example, 92% V-PCKs, 6% MCT oil, and 2% salt (100%) or 92% V-PCKs, 3% MCT oil, and 2% salt (97%).

In some embodiments, the composition contains:
1) at least 70% V-PCKs by weight;
2) 1-28% MCT oil by weight;
3) 0.5-4% salt by weight at a weight ratio of salt:MCT oil from 1:16 to 4:1;
and contains at least 97%, 98%, 99%, or even 100% of these three components, for example, 92% V-PCKs, 6% MCT oil, and 2% salt (100%); or 70% V-PCKs, 28% MCT oil, and 1% salt (99%); or 92% V-PCKs, 3% MCT oil, and 2% salt (97%).

In some embodiments, the composition contains:
1) 70-80% V-PCKs by weight;
2) 14-28% MCT oil by weight;
3) 0.5-4% salt by weight at a weight ratio of salt:MCT oil from 1:16 to 4:1;
and contains at least 98% of these three components.

In some embodiments, the composition contains:
1) 80-90% V-PCKs by weight;
2) 4-18% MCT oil by weight;
3) 0.5-4% salt by weight at a weight ratio of salt:MCT oil from 1:16 to 4:1;
and contains at least 98% of these three components.

In some embodiments, the composition contains:
1) 75-85% V-PCKs by weight;
2) 9-14% MCT oil by weight;
3) 0.5-4% salt by weight at a weight ratio of salt:MCT oil from 1:16 to 4:1;
and contains at least 98% of these three components.

In some embodiments, the composition contains:
1) 90-95% V-PCKs by weight;
2) 0.5-4.5% MCT oil by weight;
3) 0.5-4% salt by weight at a weight ratio of salt:MCT oil from 1:16 to 4:1;
and contains at least 98% of these three components.

V-PCKs+Saline Solution Compositions

The invention encompasses compositions comprising V-PCKs, salt, and added water, meaning water not from inside the V-PCKs, as well as methods of making, storing, and using these compositions. Any and all compositions that can be derived by combining any and all the disclosed percentages of V-PCKs, salt, and water are envisioned. The ratios recited herein are all weight ratios.

In one embodiment, the salt is dissolved in water prior to addition to the V-PCKs, In one embodiment, the salt is not dissolved in water prior to adding to the V-PCKs. In various embodiments, the saline solution is an at least 10%, 20%, 30%, 40%, 50%, 60%, 70%, 80%, 90%, 95%, or 100% saturated aqueous saline solution.

In various embodiments, the weight ratio of the V-PCKs: salt is at least 20:1, 25:1, 30:1, 35:1, 40:1, 45:1, 50:1, 55:1, 60:1, 65:1, 70:1, 75:1, 80:1, 85:1, 90:1, 95:1, 100:1, 200:1, 300:1, 400:1, or 500:1, or any range in between these values (e.g. between 25:1 to 100:1).

In various embodiments, the weight ratio of the V-PCKs: aqueous saline solution is between 4:1 and 25:1, or between 4:1 to 20:1, or between 5:1 and 15:1, or between 5:1 and 10:1 or between 6:1 and 15:1.

In some embodiments, the quantity of V-PCKs ranges from 28 g to 168 g and the amount of salt solution ranges from 3 g to 20 g.

Aqueous Saline Solution

The aqueous salt solution preferably contains NaCl and more preferably also KCl, in which the KCl can replace a portion of the NaCl for reducing one's dietary sodium intake. The kit ingredients can also include flavoring ingredients and sugar, the latter facilitating salt uptake and retention by popping and/or popped kernels.

In some embodiments, the NaCl concentration in the aqueous saline solution ranges from approximately 5% by weight NaCl to approximately 25% by weight NaCl or approximately equivalent to between 20% and 100% of the saturation limit of NaCl in water at room temperature.

In some embodiments, the KCl concentration in the aqueous solution ranges from approximately 5% by weight KCl to approximately 20% by weight KCl or approximately equivalent to between 40% and 100% of the saturation limit for KCl when added to the NaCl-containing aqueous salt solution described above.

The aqueous saline solution can further include an edible water-soluble sugar or other sweetener, such as *Stevia*. The water-soluble sugar can be selected from the group consisting of sucrose, glucose, fructose, galactose, maltose and lactose and combinations thereof.

In some embodiments, the aqueous saline solution further comprises one or more edible flavoring substance selected from the group consisting of natural and artificial flavoring substances.

In some embodiments, the edible flavoring substance is selected from the group consisting of water-soluble and water-insoluble flavoring substances including but not limited to garlic flavorings and onion flavorings.

As used herein with respect to the solubilities of NaCl and KCl, the term "saturation concentration" or "saturation limit" refers to the maximum solubility for each of these salts in water at room temperature, i.e., approximately 357 g per 1000 g water (26.4% by weight) for NaCl, and approximately 340 g per 1000 g (25.4% by weight) for KCl. Empirical testing has shown that equal amounts of these two salts at about half their saturation limits in water (about 13% by weight for each) may be combined in the same solution and remain soluble at room temperature. It is believed that these salts may be combined in varying proportions and remain soluble provided that their total concentration does not exceed approximately 25% by weight.

Kits

The invention encompasses kits comprising V-PCKs and an aqueous saline solution for producing a composition of the invention. The aqueous saline solution can be packaged in multiuse or single use sizes. The kits allow combination of V-PCKs and the aqueous saline solution prior to or during microwaving. The kits may comprise a burst pack that allows the V-PCKs and aqueous saline solution to mix together prior to or during microwave heating. The burst pack can allow mixing by physical pressure to burst the bag or bursting by pressure generated by expansion during heating.

Microwave Popping Bags

The invention encompasses a microwave popcorn popping bag comprising at least 20, 25, 30, 35, 40, 45, 50, 55, 60, 65, 70, 75, 80, 85, 90, 95, 100, 110, 120, 130 or 140 grams of a composition of the invention or any range between these weights (e.g. 30-55). Preferably, the bag comprises 20-150 grams of the composition of the invention. In some embodiments, the microwave bag contains V-PCKs and a burst pack containing the aqueous saline solution. In some embodiments, the microwave bag contains V-PCKs, MCT oil, and salt. Flavoring(s) can also be included.

Methods of Preparing a Popcorn Product

The invention encompasses methods of preparing a popcorn product comprising coating V-PCKs with MCT oil and salt. In preferred embodiments, the V-PCKs are coated at a weight ratio of 25:1-150:1 popcorn:oil and salt at a weight ratio of 20:1-100:1 popcorn:salt. In one embodiment, the method comprises placement of the popcorn product in a microwave popcorn popping bag, preferably in the center portion of the bag. The weight ratio of popcorn:oil can be 25:1 to 50:1, 50:1 to 75:1, 75:1 to 100:1, 100:1 to 125:1, 125:1 to 150:1 or any combination of these ratios (e.g., 75:1-125:1). The weight ratio of popcorn:salt can be 20:1 to 40:1, 40:1 to 60:1, 60:1 to 80:1, 80:1 to 100:1, or any combination of these ratios (e.g., 40:1-80:1). Preferably, the coating is homogeneous and can be applied with an MCT oil/salt slurry for example.

In some embodiments, the method comprises extracting a flavoring into an MCT oil and coating V-PCKs with the MCT oil containing the flavoring.

Methods of Popping

The invention encompasses a method comprising providing a composition of the invention and subjecting the composition to microwave radiation generally produced in a microwave oven to pop the popcorn. In some embodiments, the method comprises extracting a flavoring into an MCT oil and coating V-PCKs with the oil to generate the composition.

Preferably the composition is in a microwave popcorn popping bag that withstands the effects of microwave irradiation and superheated steam generated within the bag. The portion of the popping bag holding most of the V-PCKs is preferably placed near the center of the oven on a rotating table to provide approximately equal microwave radiation to all V-PCKs.

The oven is then usually set to full power and the kernels are microwave-irradiated for 1-5 minutes, preferably between approximately 2 and 4 minutes (depending on the oven's wattage) or until kernel popping slows to about one pop every 3 seconds. Successful microwave popping of kernels requires an oven with a sufficient flux/density of radiation (typically measured in watts) to cause production of maximum steam pressure at an elevated temperature within the kernels [estimated to be at least 130 psi and 350°

F. (177° C.)] to cause full expansion or "puffing" of the starch as the kernel explodes. A microwave oven having a minimum flux of 500 watts and generally 750 watts or greater, e.g., 1250 watts, is recommended for making microwave popcorn. It is important to turn off the microwave oven promptly when kernel popping rate slows to avoid browning or scorching of the kernels. The vessel is opened, steam is released, and the hot kernels are dropped into a serving bowl. The resulting fat-free, reduced sodium, salted kernels are ready for eating.

With regard to the microwave process of popcorn popping, a superheated steam and salt environment can be produced within the presently described kernel popping assembly as superheated popcorn kernels (containing as much as approximately 15% by weight moisture) commence popping, releasing a substantial amount of steam. The popping assembly includes either a reusable or a single use disposable, microwaveable popper vessel (aka popper or popping vessel) in which the popper has a volume capacity of at least 1 liter. The popper includes either a loose-fitting closure, slit opening, or other vapor releasing means for any steam pressure produced during microwave irradiation. The assembly with its popper vessel includes (i) a first amount of unpopped popcorn kernels (aka, virgin kernels, abbreviated "V-PCKs") ranging from approximately 28 g to 168 g and (ii) a second amount of a salted fluid carrier. When an aqueous salt solution fluid carrier is utilized, it contains: (1) a quantity of either NaCl or a mixture of NaCl and KCl whose total amount ranges between approximately 5% and 35% by weight of the amount of water in that salt solution and, optionally, (2) an amount of at least one water-soluble sugar or other carbohydrate that substantially increases the transfer and retention of NaCl and KCl by popcorn kernels during their microwave popping. The amount of sugar or other carbohydrate ranges from approximately 5% to 30% by weight of the amount of water in the aqueous salt solution.

In one embodiment, the method comprises:

providing a composition comprising virgin popcorn kernels coated with medium chain triglyceride (MCT) oil and salt and subjecting the composition to microwave radiation to pop the V-PCKs. Any of the compositions of the invention can be used in this method.

In one embodiment, the method comprises:

providing a composition comprising virgin popcorn kernels coated with medium chain triglyceride (MCT) oil, and salt, wherein the composition contains at least 95%, 96%, 97% 98%, or 99% of these three components, and subjecting the composition to microwave radiation to pop the V-PCKs.

In one embodiment, the method comprises:

providing a composition comprising at least 60%, 65%, 70%, 75%, 80%, 85%, 90, or 95% virgin popcorn kernels coated with medium chain triglyceride (MCT) oil and salt and subjecting the composition to microwave radiation to pop the V-PCKs.

In one embodiment, the method comprises:

providing a composition comprising at least 60%, 65%, 70%, 75%, 80%, 85%, 90, or 95% virgin popcorn kernels coated with medium chain triglyceride (MCT) oil and salt, wherein the composition contains at least 95%, 96%, 97% 98%, 99%, or 100% of these three components, and subjecting the composition to microwave radiation to pop the V-PCKs.

In one embodiment, the method comprises:

providing a composition comprising at least 90% virgin popcorn kernels coated with 0.5-6% medium chain triglyceride (MCT) oil and 0.5-4% salt and subjecting the composition to microwave radiation to pop the V-PCKs.

In one embodiment, the method comprises:

providing a composition comprising at least 90% virgin popcorn kernels coated with 0.5-6% medium chain triglyceride (MCT) oil and 0.5-4% salt, wherein the composition contains at least 95%, 96%, 97% 98%, or 99% of these three components, and subjecting the composition to microwave radiation to pop the V-PCKs.

Preferably, the composition is subjected to microwave radiation for 1-5 minutes, more preferably 2-4 minutes, to pop the popcorn, most preferably without burning the popcorn kernels.

In some embodiments, the method further comprises extracting a flavoring into an MCT oil and coating V-PCKs with the oil to generate the composition.

In some embodiments the method results in the popping of at least 70%, 75%, 80%, 85%, 90, 95%, 96%, 97% 98%, or 99% of the V-PCKs, most preferably without burning the popcorn kernels.

Methods of Storage and Stored Compositions

The invention encompasses a method comprising storing a composition of the invention for at least one week, two weeks, or 1, 2, 3, 4, 5, 6, 7, 8, 9, 10, 11, 12, 13, or 14 months, or any time period between these times (e.g., 3-6 months). The compositions can be any of the compositions of the invention.

In one embodiment, a mixture of V-PCKs, MCT oil, and salt is stored in a microwave bag for at least one week, two weeks, or 1, 2, 3, 4, 5, 6, 7, 8, 9, 10, 11, 12, 13, or 14 months, or any time period between these times (e.g., 3-6 months).

The invention further encompasses compositions of V-PCKs, MCT oil, and salt that have been stored, for example in a microwave bag, for at least one week, two weeks, or 1, 2, 3, 4, 5, 6, 7, 8, 9, 10, 11, 12, 13, or 14 months, or any time period between these times (e.g., 3-6 months). The compositions can be any of the compositions of the invention.

The invention further encompasses subjecting the stored compositions to microwave radiation to pop the popcorn, preferably without burning the popcorn.

In some embodiments the method results in the popping of at least 70%, 75%, 80%, 85%, 90, 95%, 96%, 97% 98%, or 99% of the V-PCKs.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of."

For the purposes of clarity and brevity herein, virgin popcorn kernels or V-PCKs (i.e. kernels that have not been heated or popped and that are commercially available in both yellow and white genetic species varietals, are abbreviated herein as "V-PCKs." The term "virgin" is preferred over the term "unpopped" because the latter term is ambiguous and often used to describe kernels that have failed to pop after heating (also known by tradition as "old maids"). Both yellow and white varietals of popcorn kernels were tested and compared for their speed in popping and fully expanding, i.e, "puffing", and for their salt uptake. No significant differences were detected between these kernel varietals. Popcorn kernels may be purchased and stored for many months before use. On the other hand, popped popcorn kernels are also termed and abbreviated herein as "P-PCKs" and may be prepared using any of a variety of popping methods either at home or commercially. These methods include but are not limited to (i) stovetop or dedicated appliance heating of the kernels in a hot vegetable oil or fat in a pot or covered pan, (ii) heating the kernels in rapidly moving stream of heated air within a "hot air popper" appliance, and (iii) microwave oven heating of the kernels. With the latter method that has growing popularity owing to the ubiquity of microwave ovens, microwave radiation causes super-heating of the moisture, starch, protein and fat within each popcorn kernel resulting in the solid starch softening, gelatinizing, and explosively expanding to break the popcorn's seed coat or pericarp (aka, the "hull" herein) of the kernel, in which the starch forms the characteristic crispy white popcorn puff. Both V-PCKs and P-PCKs may be commercially purchased, with the latter typically being pre-salted and flavored. Among the well-known commercial producers and suppliers of either yellow or white varietals of V-PCKs in the U.S. are the Weaver Popcorn Company in Van Buren, Indiana, the American Pop Corn Company in Sioux City, IA, Orville Redenbacher's®/Conagra Brands in Chicago, IL, and Bob's Red Mill® Natural Foods, Inc. in Milwaukie, OR. Popcorn kernels are typically described as 100% whole grain and a good source of fiber. Nutritionally, the kernels provide approximately 100 kcal (Calories) per serving size of approximately 1 ounce or about 2 Tbsp (28-30 g) of the V-PCKs. One 28 g serving contains approximately 1 g fat, 3 g protein and 19 g total carbohydrate (principally starch) of which between 3 g and 4 g is dietary fiber. The balance of approximately 4 g per 28 g serving of kernels is principally water whose percentage by weight is very consistent with published values of 14-15% by weight moisture for high quality commercial V-PCKs.

Example 1

Non-adherence of Salt to Dry Popcorn. It is generally appreciated that without a sufficient amount of vegetable oil or melted butter, for example, having been applied to P-PCKs, it is difficult for conventional table salt (NaCl) to adhere to the dry starch surface of popped kernels. Even if somewhat better salt retention is achieved using a finely milled salt powder, the salt is often distributed non-uniformly among the kernels. To test the retention of a finely milled salt by P-PCKs, Applicant prepared freshly popped kernels of white popcorn and tumbled two separate 5.00 g samples of the popcorn in two accurately weighed and closed PET plastic containers. These containers respectively held 107 mg and 99 mg of ground and sieved Morton table salt. More specifically, the salt had been finely ground with a mortar and pestle, and sieved through a fine stainless steel 170 mesh sieve, reducing the salt to 88 micron sized particles (therefore including smaller salt particles as well). Following the popcorn tumbling step, the kernels were carefully removed from the containers leaving any free salt behind. The containers were re-weighed, showing that over 80% of the salt remained free and unadhered to the popcorn (92 mg out of 107 mg salt and 81 mg out of 99 mg salt).

Similar results were obtained with a commercially prepared 74 micron salt ("Extra Fine 200" obtained from Morton International). The salt was tumble-mixed with V-PCKs (Bob's Red Mill® white popcorn kernels) prior to microwave popping. Between 80 and 90% of this salt failed to adhere to either the raw kernels or the resulting popcorn.

Example 2

Non-adherence of Salt in Presence of Carbohydrate Powder. The above results indicated that it would be advantageous to develop a substantially improved and convenient method for achieving greater adhesion as well as uniform distribution of salt on freshly prepared P-PCKs without needing to add fat or oil or a water mist to the popped kernels. Like many other carbohydrates, starch which constitutes most of the P-PCK structure and especially its surface, is a chemically polar non-ionic polymeric material. By contrast, table salt, consisting of crystalline NaCl, is a highly ionic material carrying the positively charged sodium cation and negatively charged chloride anion. An initial attempt was made to mask the positive and negative charges in salt particles using micro-particulate carbohydrate powders to promote adhesion of salt to P-PCKs. Accordingly, approximately equal amounts (0.6 g) of either finely milled commercial Argo brand cornstarch powder or finely milled 10× powdered Confectioner's Sugar. These powders both represent polar non-ionic materials somewhat similar to the starch surface of P-PCK. Each of these powders was separately mixed with 0.6 g quantities of regular Morton table salt. Each of these dry carbohydrate+salt powder mixtures were added to 28 g quantities of freshly prepared P-PCKs and vigorously tumbled by shaking in sealed plastic bowls. It was observed that whereas moderate amounts of the dry cornstarch and sugar powders each adhered to the P-PCK surfaces, the salt particles in both of the above mixtures separated from the accompanying cornstarch and sugar powders during tumbling, and fell to the bottom of the containers rather than adhering to the popcorn. A similar experiment was conducted in which equal 0.10 g quantities of much finer microparticulate NaCl that had been crushed and 170 mesh-sieved (88 micron sized particles) were blended together with either 0.10 g of the cornstarch or 0.10 g of the Confectioner's Sugar described above. These two powder blends were each tumbled with 5 g quantities of P-PCKs to determine whether much smaller microparticulate NaCl, when combined with carbohydrate "carrier" powders, might better adhere to freshly prepared P-PCK. By subsequently weighing and tasting the powders that failed to adhere to the popcorn kernels, it was evident that very small NaCl particles (as well as the previously tested coarser granular NaCl particles) both adhere poorly to P-PCK regardless of the presence of "carrier" material in the form of either microparticulate starch or sugar. While disappointing, these results suggested that retention of salt by the starch surface of unmodified popped popcorn kernels might be better achieved if salt in a somewhat different physical state might be introduced by absorption or adsorption during rather than after kernel popping.

Example 3

Adherence of Salt with Water. With regard to fluid contact with the tough outer hull of the V-PCKs, palm oil can be added to V-PCKs as both a heat transfer medium and flavorant before heating to initiate kernel popping. Unlike addition of an oil to V-PCKs, it would be considered risky, very possibly damaging, and also counterintuitive to add water to dry popcorn kernels for any period of time before popping the kernels. This is because water would likely soften the outer hull of the dried popcorn kernel and could therefore reduce or limit the desired build-up of steam pressure inside the kernel during heating needed for achieving maximum popping of the kernels. Expressed another way, any loss of kernel hull rigidity in the V-PCK could easily diminish the required explosive expansion of starch within the kernel to produce the desired starch puffing. It has estimated that the build-up of steam pressure inside the V-PCK prior to popping may reach 135 psi at a temperature of approximately 356F (see Lusas, Edmund W.; Rooney, Lloyd W. (2001). *Snack Foods Processing. CRC Press. ISBN* 978-1-56676-932-7 and Wikipedia entry for "popcorn").

In spite of the importance of maintaining hull rigidity and the risks presented by addition of any water to dry popcorn kernels, Applicant made the following surprising observation: Before microwave heating and popping of approximately 2 to 4 oz (50-120 g) of popcorn kernels, a substantially smaller quantity (by weight) of a highly concentrated aqueous salt solution (e.g., 5-10 g of a nearly saturated NaCl solution (or NaCl+KCl mixed solution) could be added to the kernels of popcorn in a microwave popping vessel (PROPPER POPPER). The vessel is a round microwaveable heat-resistant silicone rubber vessel with a capacity of about 4 liters and whose interior surface resembles a half sphere. The vessel has round flexible lid (fabricated from the same silicone rubber) and that rests inside and across the upper portion of the vessel. The lid allows steam to escape during microwave popping of kernels. With one ounce of kernels yielding approximately 1 liter of popped kernels, somewhat more than 3 ounces of kernels can be popped in this vessel at a time. This vessel was utilized in the present example as well as in most of the examples that follow. Specifically in the present example, approximately 7 g of an aqueous salt solution containing 20% by weight dissolved NaCl was placed beneath the kernels (V-PCKs) before closing the vessel and commencing microwave heating. Surprisingly, in less than 3 minutes, essentially all the kernels emerged popped and fully puffed just as quickly as the same quantity of kernels popped in the absence of the salt solution. Remarkably, for the 50-120 g quantities of kernels popped, the puffed kernels were able to efficiently absorb and/or adsorb essentially all of the input of salt during popping. For example, a series of aqueous NaCl solutions were prepared in which the salt solutions contained increasing NaCl concentrations ranging from approximately 20 to 100% of the saturation limit of NaCl in water at room temperature. For NaCl, that saturation limit is approximately 357 g salt per 1000 g water at 20° C. The above 20-100% saturation range corresponds to approximately 5% to 25% by weight NaCl dissolved in water. In a series of microwave popping experiments (where 5 to 10-fold less salt solution was used for a constant 50 g weight of virgin kernels) little if any residual dried salt was left behind in the popping vessel following popping. Moreover, by tasting randomly selected popped kernels within each batch of popped kernels, it became apparent that nearly all the popped kernels within each single batch tasted comparably salted. Surprisingly, this salting uniformity among popped kernels within a popcorn batch is achieved in spite of the far greater volume of popped kernels compared to the amount of salt solution in the popping vessel. For example, when only 5-7 g salt solution is often combined with about 56 g (2 oz) virgin kernels, and where the corresponding expanded volume of popped kernels is approximately 2 liters, the ratio of popped kernels to salt solution is approximately 2000 ml popcorn versus 5 ml salt solution or 400:1. Thus salting uniformity among the popped kernels seems remarkable.

Example 4

Reducing Sodium Content of Popcorn. With regard to popcorn consumption and dietary health, the control and limitation of dietary sodium intake sodium is known to provide health benefits. Accordingly, a series of tests were conducted to replace 50% or more of the NaCl in various popcorn salting recipes with potassium chloride (KCl). Potassium chloride has nearly the same solubility parameters and limits in water as NaCl. The KCl saturation limit is approximately 340 g per 1000 g water at 20° C. Regarding effective salt uptake by popcorn from aqueous solutions during popcorn popping, testing results obtained by Applicant for KCl were essentially indistinguishable from those for NaCl. The flavor quality however, was judged to be superior utilizing NaCl or utilizing approximately equal amounts by weight of NaCl and KCl rather than substituting KCl for the entirety of NaCl. These observations for flavor quality are consistent with those of Araujo et al. obtained when replacing some or all of the NaCl in crackers with KCl [Food Research International 150 (2021) 110798]. With recommended Daily Values (DV) from the U.S. Institute of Medicine for dietary intake of potassium and sodium being approximately 4700 mg and 1500-2300 mg respectively (or approximately 9000 mg for KCl and 3800-5800 mg for NaCl), it would be beneficial to replace at least half of the NaCl in salted popcorn by KCl. In the following experiments and Examples, it is evident that the amount of sodium chloride being added to popcorn for its ability to improve taste can be greatly reduced. This reduction is attributable to: (1) the efficacy of achieving a prominent salty taste using the presently described "solution method" of instilling NaCl into popcorn kernels during kernel popping and (2) the ease of substituting KCl for at least half of the NaCl in popcorn salting solution recipes. Thus, in Example 19 below, four ounces of popcorn is salted with only 800 mg NaCl (plus 1000 mg KCl). Therefore, a one ounce serving of popcorn would contain only 200 mg NaCl, providing only 80 mg sodium. With the current Daily Value for sodium having been reduced to as little as 1500 mg, a one ounce serving of the popcorn of Example 19 would, quite remarkably, contribute only 5% of the DV for sodium.

Example 5

Dry Salt Uptake by Dry Kernels During Microwave Popping. Approximately two ounces (60 g) of Bob's Red Mill® white popcorn kernels (aka, V-PCKs) were combined with 2.40 g dry granular NaCl (Morton salt) by tumbling the kernels with the salt and placing the mixture in the bottom of a temperature-resistant round-bottom silicone rubber popcorn popper vessel with a friction-fitted silicone rubber lid (the "PROPER POPPER" brand of microwaveable vessel having an approximate 4 liter capacity with an overall height of approximately 14 cm and outer diameter of approximately 20 cm. The vessel was microwave-heated at full power in a 1250 watt PANASONIC "GENIUS PRESTIGE" brand microwave oven until kernel popping had just ceased as monitored by listening (2 min 35 sec of heating). Salt residues remaining in the popping vessel after kernel popping were weighed and totaled 2.05 g indicating that no more than 15% of the salt had been retained by the kernels during popping.

Example 6

Salt Retention Increased by Moistening Kernels Before Microwave Popping. Example 5 was repeated except that the same 60 g quantity of V-PCK kernels were moistened with 2.0 g water before tumbling and coating the kernels with 2.40 g dry granular NaCl immediately before microwave heating. Kernel popping ceased after 2 min 32 sec of heating. Dried salt residue that was recovered from the popping vessel weighed 1.41 g indicating that no more than 1.0 g or approximately 40% of the 2.40 g salt was retained by the kernels during popping. Nine kernels out of approximately 450 remained unpopped.

Example 7

Pre-dissolved Salt Uptake by Kernels During Microwave Popping. Example 6 was repeated except that the same 60 g quantity of V-PCK kernels were mixed with 2.40 g of the same NaCl (Morton salt) that had been pre-dissolved in 7.00 g water (near the saturation limit for NaCl) before microwave heating in the same vessel. Kernel popping ceased after 3 min 0 sec heating. Dried salt residue remaining in the popping vessel weighed 0.92 g indicating that approximately 1.48 g or approximately 62% of the salt was retained by the kernels during popping. Eight kernels out of approximately 450 remained unpopped.

Example 8

Amount of Dissolved Salt May Affect Total Uptake by Kernels During Microwave Popping. Example 7 was repeated except that 50 g of the same V-PCK kernels were combined with a lesser amount of the salt, i.e., 1.40 g dissolved in 4.0 g water (rather than 2.40 g dissolved in 7.0 g water) before microwave heating in the same vessel. Kernel popping commenced after 1 min 5 sec and ceased after 2 min 30 sec heating. Dried salt residue remaining in the popping vessel weighed 0.24 g indicating that approximately 1.16 g or about 80% of the salt was absorbed by the kernels during popping. Only four kernels out of approximately 380 remained unpopped.

Example 9

Reproducibly of Salt Uptake Results. Example 8 was repeated for establishing reproducibility of heating and popping times and salt transfer. Kernel popping commenced after exactly 1 minute and ceased after 2 min 15 sec heating. Only six kernels out of approximately 380 remained unpopped and approximately 80% by weight of the salt was again transferred to the popped kernels.

Example 10

Flavoring With Aqueous Garlic Extract, and Effect on Salt Uptake by Kernels. Examples 8 and 9 were repeated for popping and salting the same 50 g quantity of V-PCK kernels with the same 1.40 g quantity of NaCl except that the NaCl (Morton salt) was pre-dissolved in 5.0 g aqueous "garlic juice" rather than 4.0 g water before microwave heating in the same vessel. The garlic juice was decanted from a commercial preparation of minced garlic in which the juice contained water, citric acid, and small amounts of other dissolved ingredients. The intent of this experiment was to determine whether popcorn could be garlic-flavored during microwave popping of kernels. Popping ceased after 2 min 35 sec of microwave heating, and the popped kernels indeed acquired a pronounced garlic flavor. Only 2 kernels out of approximately 380 remained unpopped. More surprisingly, no salt residue whatsoever was visible in the popping vessel.

This novel observation suggested that more of the salt had been transferred and retained within the kernels during popping than in the previous examples. The question raised by this experiment was whether some soluble non-salt ingredient(s), e.g., a soluble carbohydrate or organic acid contained in the garlic juice might have aided in transfer and retention of salt by the popcorn kernels during the microwave popping process.

Example 11

Effect of Dissolved Sucrose on Salt Uptake by Kernels. Example 4 was repeated using 5.40 g of the same salt solution (containing 1.40 g of the same granular NaCl dissolved in 4.0 g water) except further dissolving and adding 2.0 g sucrose (cane sugar) within the salt solution before combining that solution with 50 g of the same V-PCK kernels and microwave heating in the same vessel. Kernel popping commenced after 54 sec heating and ceased after 2 min 19 sec. No trace whatsoever of salt or sugar residue remained on the interior walls of the popping vessel. This observation confirmed that addition of a solubilized carbohydrate, i.e., cane sugar (sucrose or table sugar) to the salt solution could aid in the full transfer of salt to the popped kernels during the microwave popping process.

Example 12

Effect of Reducing the Amount of Dissolved Sucrose by 50% on Salt Uptake by Kernels. Example 11 was repeated using 5.40 g of the same salt solution (containing 1.40 g of the same granular NaCl dissolved in 4.0 g water) except adding and dissolving a reduced amount of sucrose i.e., adding only 1.0 g rather than 2.0 g before dissolving in the salt solution and combining with 2 oz (56 g) of the same V-PCK kernels (rather than 50 g) and microwave heating in the same vessel. Kernel popping commenced after 55 sec heating and ceased after 2 min 16 sec. As in Example 11, no visible salt or sugar residue remained in the popping vessel. This finding indicates that addition of a lesser amount of sucrose (as little as 1.0 g) to the salt solution still facilitates the full transfer of salt to the popped kernels during the microwave popping process.

Example 13

Effect of Reducing the Amount of Dissolved Sucrose by 75% on Salt Uptake by Kernels. Example 8 was repeated using 5.40 g of the same salt solution (containing 1.40 g of the same granular NaCl dissolved in 4.0 g water) except that the amount of sucrose was further reduced, adding only 0.50 g before dissolving in the salt solution. That is, while the sucrose was initially reduced from 2.0 g to 1.0 g, in this example, the dissolved sucrose level was further reduced to only 0.50 g sucrose before the salt solution was combined with the same 56 g quantity of V-PCK kernels and microwave heated in the same vessel. Kernel popping commenced after 54 sec heating and ceased after 2 min 17 sec. However, when compared to the results in Examples 7 and 8, a definite and clearly visible salt residue appeared on the interior surfaces of the popping vessel. This observation indicates that while addition of as little as 1.0 g sucrose is sufficient to promote complete transfer of 1.40 g dissolved NaCl to 56 g of popcorn kernels, 0.50 g sucrose is insufficient for achieving full transfer of this amount of salt to the popped kernels during the microwave popping process.

Example 14

Adjusting the Relative Amounts of Dissolved Sucrose and Salt for Full Salt Uptake by Kernels. Example 13 was repeated except one-half as much of the salt solution was used while maintaining the same 0.50 g reduced amount of sucrose and also maintaining the full 56 g amount of popcorn kernels. Accordingly, 2.70 g of the same salt solution was used (providing 0.70 g of NaCl dissolved in 2.0 g water) and 0.5 g sucrose was then added and dissolved. The resulting solution that was then combined with 56 g of the same V-PCK kernels and microwave heated in the same vessel. Kernel popping commenced after 48 sec heating and ceased after 2 min 18 sec. Unlike Example 9, the interior surfaces of the popping vessel were clean with no visible salt or sugar residues. This observation indicates that while addition of 0.5 g sucrose was not sufficient to achieve full transfer of a larger amount of NaCl (1.4 g NaCl provided in 5.40 g of the salt solution), this reduced amount of sucrose (0.5 g) was in fact sufficient for full transfer of half the amount of NaCl (0.70 g NaCl in 2.7 g of the same salt solution) while popping 56 g of the kernels. This finding suggests that for a given amount of NaCl to be fully transferred to a quantity of kernels during popping (rather than to the walls of the microwave vessel), a minimum ratio of sugar to salt is required for that full transfer to occur. In the above examples, 1.0 g and 0.5 g of sucrose promoted full transfer of 1.4 g and 0.7 g of NaCl respectively to the kernels, i.e., sucrose/NaCl weight ratios of 0.71 in both cases. Reducing this weight ratio by half, i.e., 0.5 g sucrose/ 1.4 g NaCl reduced but did not block salt transfer to the kernels. A taste comparison of saltiness among randomly selected popped kernels produced in this Example 14 with the popped kernels in Example 913 indicated that salting uniformity was achieved among the kernels in both examples. Notably however, the popped kernels in Example 9 tasted considerably saltier than those in Example 14, consistent with the ratio of salt weight to kernel weight being 2-fold greater in Example 13 than in Example 14. Notably however, the reduced level of saltiness in Example 14 (0.70 g NaCl for 2 oz popcorn) was judged sufficient and agreeable by a group of four adult tasting volunteers.

Example 15

Increasing the Amount of Dissolved Sucrose to Assure Full Salt Uptake by Kernels. Example 14 with its reduced level of salt was repeated with minor modifications. 56 g of the same V-PCK kernels were popped in the same microwave vessel containing 5.7 g of salt solution containing 4.0 g water, 0.70 g NaCl and 1.0 g sucrose. The moderately increased amounts of water and sugar were included to provide a somewhat greater "safety margin" for full and homogeneous transfer of salt to the popped kernels. Kernel popping commenced after 54 sec of microwave heating and ceased after 2 min 18 sec. The silicone rubber interior of the microwave popping vessel was again clean, showing no residues whatsoever of salt or sugar, and only 2 kernels remained unpopped.

Example 16

Maintaining the Addition of Sucrose and Replacing a Portion of NaCl by KCl in Salt Solution Assures Mixed Salt Uptake by Kernels. Example 15 was repeated with the following modifications. To produce popcorn containing a reduced level of dietary sodium, some of the NaCl salt was replaced by KCl. Accordingly, 56 g quantities of the same V-PCK kernels were popped in two different solutions each containing 5.0 g water, 0.40 g NaCl and 0.50 g KCl accompanied by either: (1) no sucrose or (2) 0.50 g sucrose respectively. Results were as follows:

(1) Kernel popping began after 57 sec and ceased after 2 min 27 sec. A very visible salt residue appeared as a 4 inch diameter white coating in the popping vessel.

(2) Kernel popping began after 58 sec and ceased after 2 min 32 sec. No salt residue appeared in the popping vessel. Therefore, maintaining the presence of sucrose while substituting KCl for a portion of the NaCl was important for maintaining the full transfer of salts to the popped kernels. Unpopped kernels were not observed. Both the level and the taste quality of the saltiness in the popped kernels was judged to be excellent in spite of approximately half of the NaCl having been replaced by KCl. It is interesting to note in this example that 0.50 g sucrose was capable of promoting full transfer of 0.90 g of mixed salt (0.40 g NaCl+0.50 g KCl) with a weight ratio of sucrose/mixed salt=0.56. The result from Example 13 however, suggests a limit to the efficacy of sugar for promoting salt transfer to popcorn during popping, where 0.50 g sucrose was insufficient for full transfer of 1.4 g salt (weight ratio of sugar/NaCl=0.36).

Example 17

Ratio of KCl to NaCl in Salt Solution Can be Altered Without Affecting Uptake of Salts by Kernels. Example 16 item (2) was repeated except that the amount of KCl was reduced from 0.50 g to 0.28 g so that the same 56 g quantity of V-PCK kernels was microwave popped using a solution containing 5.0 g water, 0.40 g NaCl, 0.50 g sucrose and 0.28 g KCl. Full transfer and uptake of salts by the popped kernels was evident from the absence of any residue of salt in the popping vessel. Given the weight ratio of sucrose/mixed salt=0.50 g/0.68 g=0.74, this ratio of sucrose to salt was expected to enable full transfer of salt to the popcorn. Finally, based on the 56 g quantity of kernels, the calculated weight percentages of ingredients in the popcorn were approximately: 0.7% NaCl, 0.5% KCl and 0.9% sucrose. As with Example 16, the quality of saltiness in the popped kernels was judged to be excellent.

Example 18

Lactose Replacing Sucrose in Reduced Sodium Salt Solutions with Full Uptake of Salts by Popped Kernels. Example 16 was repeated with certain modifications. As with Example 16, to produce popcorn containing a reduced level of dietary sodium, some of the NaCl salt was again replaced by KCl. Furthermore, to minimize any tendency of added sugar to caramelize with the elevated temperatures produced during microwave irradiation, sucrose was replaced in this example by lactose. Published caramelization temperatures for common sugars (the temperatures at which individual sugars begin to rapidly oxidize and turn brown) are as follows: fructose 230° F., galactose 320° F., glucose 320° F., sucrose 320° F., maltose 356° F. and lactose 397° F. Given that lactose, a glucose-galactose subunit disaccharide, has been shown to caramelize at a temperature nearly 80° F. higher than sucrose, a glucose-fructose subunit disaccharide, lactose was considered to be potentially very useful. Accordingly, lactose was substituted for sucrose and tested in the system used in Example 16. A 56 g quantity of the same V-PCK kernels was microwave heated and popped together with a solution containing 5.0 g water, 0.40 g NaCl, 0.50 g KCl and 0.50 g lactose (lactose obtained from Grande Custom Ingredients Group, Fond Du Lac, WI). Results were as follows: kernel popping began after 56 sec microwave heating and ceased after 2 min 23 sec. Given the potential utility of lactose, this test was duplicated with very similar results. Kernel popping began after 58 sec heating and ceased after 2 min 20 sec. With both tests there was no visible residue of either salt or sugar in the popping vessel and there was no discernible difference in flavor caused by substituting lactose for sucrose. It is noted that the amount of dietary lactose being consumed in a one ounce (28 g) serving of this popcorn (0.25 g lactose) is negligible, i.e., 0.25 g being approximately 50-fold less than the amount of lactose consumed in an 8 oz serving of regular milk (12 g lactose). Notwithstanding this dietary consideration, there is a likely advantage in using lactose rather than sucrose in which both sugars enable full and complete transfer of salts (both NaCl and KCl) from aqueous salt solutions to the popcorn kernels during the popping process. More specifically, a close visual inspection of the hulls found inside popcorn kernels following kernel popping shows a difference in color between lactose-popped kernels (lighter in color) and sucrose-popped kernels (darker in color). This interior hull location results from the hull being subsumed into the kernel's interior as the gelatinized starch in the kernel expands outward during popping. The color of that hull varies from kernel to kernel, likely depending on the extent of oxidation of its surface during microwave popping. It is also hypothesized that lactose and sucrose added to the differing salt solutions described herein, and contacting the kernel hulls at the elevated temperatures generated during microwave heating, may be oxidized to differing extents. These factors may explain why the hulls in popcorn kernels that had been microwave popped in the presence of lactose and salts were noticeably lighter in color than the hulls in kernels that had been popped in the presence of sucrose and salts. The lighter color of popcorn hulls resulting from using lactose rather than sucrose in microwave popcorn kernel salting solutions may be additionally preferred when kernel flavor is closely evaluated.

Example 19

Doubling the Batch Size of Popcorn from 2 oz to 4 oz of Kernels with Reduced Dietary Sodium in Salt Solution Formula. The microwave popcorn recipe and procedure in Example 18 was repeated except that the batch size was doubled. This test was used to determine the feasibility of using twice as much of the same salt solution and twice as many kernels in the same microwave popping vessel. Accordingly, 112 g (4 oz) of the same popcorn kernels used in Example 18 were microwave heated and popped together with an aqueous salt solution containing 10.0 g water, 0.80 g NaCl, 1.00 g KCl and 1.00 g lactose (twice the quantity used in Example 18). Results were as follows: kernel popping began after 1 min 26 sec microwave heating and ceased after 3 min 10 sec. Following kernel popping there was no visible residue of either salt or sugar in the popping vessel and there was no discernible difference in appearance or flavor between the popcorn produced in this example when compared to the 56 g batch size popcorn produced in Example 18.

Example 20

Unheated Popcorn Kernels Can Hold Approximately 9%-11% by Weight Salt Solution. The percent by weight capacity of virgin unheated popcorn kernels (V-PCKs) to retain an aqueous salt solution (10.00 g water, 0.80 g NaCl, 1.00 g KCl) by adsorption prior to microwave heating and popping was measured. 56 g virgin kernels (Yoder Popcorn Inc., "White Tiny Tender") were mixed and gently agitated with this salt solution in a beaker at room temperature for one minute. The kernels were then transferred to a wire strainer to allow free liquid to drain before the kernels were re-weighed. The kernels retained 5.01 g (8.9% by weight) of the salt solution. Using the same testing protocol, this test was repeated using Bob's Red Mill® "White Popcorn" kernels and 56 g of these kernels retained 5.35 g (9.6% by weight) of the salt solution. Once again using the same testing protocol, except that 1.00 g lactose sugar was added and dissolved in the above aqueous salt solution, this test was repeated using 56 g of the same Bob's Red Mill® "kernels and these kernels retained 5.98 g (10.7% by weight) of the lactose-supplemented salt solution. Based on these tests, popcorn kernels adsorb about 10% by weight of the above-described salt solutions.

Example 21

Normal Popping and Full Puffing of Kernels After 5 min. Submersion in Salt Solution. To determine whether longer contact time with the aqueous salt solution in Example 20 (10.00 g water, 0.80 g NaCl, 1.00 g KCl) would result in greater retention (adsorption and absorption) of the solution, the Example 20 protocol with Bob's Red Mill® "White Popcorn" kernels was repeated except that the kernels were submerged and gently agitated for a greater period of time in the same aqueous salt solution (without lactose). The kernels (56 g) were submerged and agitated for 2 minutes, then drained in a wire sieve, and re-weighed. This process was repeated for a series of one minute intervals. The weights of salt solution retained after 2, 3, 4 and 5 minutes of submersion were as follows: 7.5 g, 7.9 g, 8.1 g and 8.0 g. These very slightly increasing retention quantities correspond to 13.4% by weight retained after 2 min, increasing to 14.3% retained after 5 min. Following the 5 min submersion, the kernels were placed in the popper vessel of Example 5 and microwave heated at full power. Kernel popping commenced after 59 sec and stopped after 2 min 17 sec (typical timing based upon above examples) and kernels were fully puffed (full expansion of kernel's starch judged by size of kernels after popping).

Example 22

Prolonged Water Contact (but Not Saturated Salt Solution Contact) With Popcorn Kernels Prevents Normal Popping of Kernels. ½ oz samples of Bob's Red Mill® white popcorn kernels were submerged for 12 hours in beakers containing either 100 ml water or 100 ml saturated salt solution at room temperature (containing 35 g NaCl dissolved in 100 ml water). Free liquid remaining after draining was blotted from the kernels with paper towels and the kernels were placed in the "Proper Popper" silicone rubber microwave popping vessel (see Example 5). The kernel samples were each microwave-heated at full power (1250 watts). The water-treated kernels commenced popping after 50 sec and finished popping after 2 min 20 sec. The salt solution-treated kernels commenced popping after 54 sec and finished popping more rapidly (after only 1 min 30 sec). The water-treated kernels popped with remarkably loud sounds and produced only very small ball-shaped popcorn (approximately 1 cm diameter) having a tough texture when chewed.

Additionally, the kernel hulls remained on the surface of these balls and were somewhat elastic. By comparison, the 12 hour salt solution-treated kernels produced full-sized and fully puffed kernels (approximately 2 cm diameter) having a normal texture when chewed. The difference in microwave popping quality between water-soaked versus saturated NaCl solution-soaked kernels is remarkable. These observations suggest that the reduced water activity in a saturated NaCl solution compared to regular water may allow the strong and rigid kernel hull structure present in dry popcorn kernels to be preserved and provide normal popping. A strong hull is believed necessary for withstanding and containing the elevated steam pressures needed for full expansion and puffing of the hot gelatinized starch within the kernel, i.e., "normal popping".

Example 23

Salt Solution-Coated Kernel Hulls Can Scorch After Extended Contact with Popcorn Bag Interiors. Commercially available single-use polymer-laminated paper microwave popcorn bags filled solely with popcorn kernels (3 oz) were purchased from Whole Foods Market (marked as a "365" brand product). The boxed popcorn product contains 3-3 oz bags of kernels and is described as "Organic No Oil or Salt Added Microwave Popcorn." The goal of this experiment was to determine whether the salt solution of Example 21 could be used to treat the kernels in these bags and allow microwave popping of the kernels. Accordingly, 10 g of the salt solution of Example 21 was injected into the body of kernels inside the bag through a small slit placed in sidewall of one of the bags. The slit was taped firmly closed using a transparent polypropylene adhesive tape product (3M Scotch brand Shipping/packaging tape, 2 inch width). This product is remarkably heat-resistant. After shaking, inverting and tilting the bag side to side for approximately one minute the bag was microwaved for 2 min 40 sec at full power until popping substantially ceased. The bag was emptied of kernels and the bag's interior surfaces and the popped kernels were examined. The lower interior surface of the bag (but not the upper interior surface) showed countless small round scorched imprints where the super-heated kernels had resided before popping. The white exterior surfaces of the puffed kernels were accompanied by scorched and often blackened interior hull surfaces visible inside the puffed kernels. The conclusion from these observations is that the salt solution that had coated the hull surfaces of the kernels resting on the interior surface of the paper popper bag had become so hot during microwave irradiation that both the hull surfaces and the contacted paper bag surface underwent charring. This charring was followed by kernel popping that moved the charred hull surfaces into the interiors of the puffed kernels. An internet web search suggests that concentrated aqueous salt solutions can become extremely hot when subjected to microwave radiation due to the electrical conductivity of these solutions and the rapid motion of chloride anions. Thin aqueous salt films that surrounded the popcorn kernels in this example clearly became very hot before drying.

Example 24

Avoiding Scorching of Salt Solution-Coated Kernel Hulls Contacting Microwave Popcorn Bag Interiors by Reducing the Amount of Salt and Microwave Time. Commercially available Orville Redenbacher's "MiniBags," each containing a 42.5 g mixture of popcorn kernels, palm oil, salt and flavorings in single-use microwaveable/expandable polymer-coated paper bags were purchased. The contents of each of two bags were removed through a razor-cut slit along the sidewall of each bag. After carefully cleaning the inside surfaces of the two bags, 28 g quantities of Bob's Red Mill® white popcorn kernels were pre-coated with either 3.0 g or 2.2 g of the salt solution described in Example 21 and placed inside these two cleaned bags (marked #1 and #2 respectively). The bags were firmly re-sealed with 3M packaging tape as described in Example 23. It is noted that in Example 21, 56 g of these same kernels were able to adsorb and retain 8.0 g of salt solution, so that one-half this quantity of kernels, i.e., 28 g in the present example, was able to easily retain both 2.2 g and 3.0 g of the same salt solution. The two bags were each microwaved at full power (see Example 5) for different lengths of time (bag #1 for 1 min 40 sec and bag #2 for 1 min 15 sec). The bags were emptied of their kernels and the bags' interior surfaces and popped kernels were examined. Whereas the interior surface of bag #1 and hull surfaces inside many of its popped kernels showed significant scorching (browning and blackening), the corresponding surfaces in bag #2 showed no discoloration or scorching whatsoever. A tasting of the popped kernels from each of the two bags showed remarkably little difference in perceived saltiness in spite their salt input difference. Therefore, controlling and limiting the weight ratio of salt solution to popcorn kernels while also limiting the microwave exposure time can enable microwave popping of salt solution-coated popcorn kernels in conventional laminated paper microwave popcorn bags currently being used and sold commercially.

Example 25

Avoiding Superheating of Popcorn Kernel Hulls and Preventing Melting of Thermoplastic Films by Diluting Microwave Popcorn Salt Solutions. Two aqueous salt solutions (A and B) were prepared for microwave popping of 56 g samples of Bob's Red Mill® white popcorn using the reusable silicone rubber popping vessel of Example 5 at full power (1250 watt). These two solutions differed from those described above by containing twice as much water (10 g instead of 5 g) relative to the same amounts of salt. One of these two solutions also contained lactose. Accordingly, solution A contained 10.0 g water, 0.40 g NaCl, and 0.50 g KCl whereas solution B contained 10.0 g water, 0.40 g NaCl, 0.50 g KCl and 0.50 g lactose. The kernels in solution A and solution B commenced popping after 82 sec and 75 sec of microwave irradiation respectively. Popping was completed after 2 min 40 sec and 2 min 35 sec respectively. Similar tests described in a number of the previous examples (see above) showed kernel popping commencing after only approximately 55 sec microwave irradiation. It is believed that the additional 20-27 sec before kernel popping commenced in the present example is attributable to the doubling in the amount of water from 5 g to 10 g. The additional 5 g water likely causes a decrease in microwaved salt solution temperature given that salt concentration-dependent microwave superheating of aqueous NaCl solutions is a well-known phenomenon. If so, a decrease in salt solution temperature would likely increase the time required for kernels to begin popping. Beneficially, the popped kernels from these two tests showed no visible darkening or scorching of kernel hulls. Coincidentally, 14 kernels remained unpopped after microwaving with both solutions A and B.

The two microwave popcorn tests in this example (see above) were repeated, except that two disposable temperature-resistant nylon oven bags were used (measuring 9"×14"

when flat, and fabricated from 1.1 mil thick film) rather than the reusable silicone rubber vessel. The nylon bags have an expanded volume of approximately 5 liters when loosely closed with a rubber band at a location approximately 5 cm from the top of the bags to allow for steam release. The same 56 g quantities of popcorn kernels and same aqueous salt solution compositions described above (including 10 g water) were utilized. Kernels were added into the salt solutions that had been placed in the bottoms of the nylon bags just prior to microwave irradiation. Each bag was placed at the center of the rotating table in the microwave oven set to full power. Kernel popping began after approximately 70 sec heating and ended after approximately 2 min 30 sec for both bags. A small amount of moisture condensation was visible in the bags following their removal from the microwave oven. Only 4 and 5 kernels remained unpopped in the two bags. An earlier trial of these nylon bags utilized the same salt formula, but was 2-fold more concentrated (5 g rather than 10 g water). That trial had shown undesirable spot melting of the bags where the salt solution-coated kernels had resided during microwave heating. However, no such nylon melt-through occurred in the present test. The results described herein show that single-use disposable microwave popcorn bags as well as reusable vessels can be used to produce salted popcorn in a single step by combining unheated virgin kernels of popcorn with such salt solutions prior to commencing microwave oven irradiation.

Example 26

Aqueous Salt and Sugar Solution is Adsorbed onto Popcorn Kernels During Microwave Heating Before Kernels Commence Popping. A question that had remained unanswered was that of event sequence, i.e., whether kernels pop first in the presence of superheated salt solution before absorbing superheated salt solution droplets or alternatively, whether the heated kernel hull surfaces become coated with superheated salt solution before subsequently popping. An initial test was conducted using 28 g of Bob's Red Mill® white popcorn placed in the reusable silicone rubber popping vessel of Example 5. The kernels were irradiated at full power (1250 watt) together with 3.2 g aqueous salt and sugar solution (2.5 g water, 0.2 g NaCl, 0.25 g KCl and 0.25 g lactose). As soon as the first kernel was heard to pop (at 55 seconds of irradiation), the vessel was removed from the microwave oven and its interior immediately examined. This test revealed that all of the salt solution had moved from the bottom of the vessel, having presumably boiled, concentrated, and moved upward into the kernels without any salt liquid or residues visible on the interior of the silicone vessel. Except for the one popped kernel, the remaining heated kernels appeared swollen, salt-coated and ready to pop. Multiple tests have shown that the presence of sugars including sucrose or lactose increase the transfer of aqueous dissolved salts to kernels during microwave popping. The present test indicates that dissolved lactose along with sodium and potassium chloride salts move and adhere to heated kernels before the kernels pop. The adhesion of salt to the kernels' hull surfaces is likely aided by sugar, e.g., lactose or sucrose, with its stickiness that helps the concentrated hot salt solution move to and remain on the kernels. With other microwave kernel popping tests in which sugar was omitted from the aqueous salt solution, significant amounts of salt failed to transfer to the kernels. Instead, salt residues were deposited and dried onto the interior surfaces of the silicone rubber vessel and onto the underside of the vessel's lid. These residues are likely caused by the diminished ability of superheated salt solutions lacking the sugar to adhere to the somewhat hydrophobic outer hull surfaces of the kernels.

The above test was repeated, doubling the quantity of kernels to 56 g and doubling the sugar-salt solution to 6.4 g. Kernel popping commenced after 70 seconds of irradiation and the vessel was again immediately removed from the microwave oven and its interior examined. Its interior surfaces were dry and all of the aqueous salt and sugar solution had moved onto the kernels' surfaces, without any salt residues visible on the vessel's interior surfaces. The vessel was promptly returned to the microwave oven and microwave irradiation was resumed. After a total of 140 seconds irradiation, popping ceased. Sixteen kernels remained unpopped and again there was no visible salt residue inside the silicone rubber popping vessel. The fact that a superheated concentrated salt solution could be fully transferred to the exterior hull surfaces of heated popcorn kernels before popping commenced is surprising. This apparently uniform transfer of salt to the unpopped kernels' hull surfaces may have been responsible for the popped kernels subsequently evaluated for salty flavor, all tasting comparably salted. Without wishing to be bound by theory, one explanation for the effectiveness of this salting process is that when microwave-heated kernels carrying an outer salt coating undergo popping with the accompanying flow of hot gelatinized starch in many directions, the starch picks up salt from the kernels' hull surfaces over which the starch is flowing. In effect, the kernel is turned inside out as the superheated gelatinized starch explodes outward, leaving the outer hull surface of the original kernel deep inside the popped kernel.

Example 27

Medium Chain Triglycerides (MCTs) Provide a Non-Aqueous Fluid Carrier for Adding Salts and Flavorings to Popcorn Kernels During Microwave Irradiation. A food-compatible medium chain triglyceride oil (MCT oil), liquid at room temperature, was assessed for suitability as a Non-Aqueous Fluid Carrier for microwave popcorn. The MCT oil used, Neobee® M-5, which was produced and provided by Stepan Lipid Nutrition, Inc. and is a caprylic/capric triglyceride containing 66% by weight C8:0 and 32% by weight C10:0 esterified fatty acids. To the inventor's knowledge, the utility of MCT oil for microwave popping of V-PCKs has not previously been examined. To the extent that the MCT carrier might interfere with microwave heating and popping of kernels, a 2.0 g quantity of MCT liquid was applied as a coating onto a 56 g sample of virgin kernels (BOB's RED MILL white popcorn). These coated kernels were then placed in the silicone rubber popping vessel of Example 5 and were thoroughly mixed with 1.0 g of salt powder (1:1 mixture of NaCl and KCl). With the microwave oven set at full power (1250 watts), the irradiation times required for kernel popping to commence (aka "first pop") were recorded for the MCT oil. These "first pop" times were compared with those times recorded for microwave popping 56 g quantities of the same kernels using aqueous salt solutions containing the same amount of salts (i.e., in which the "carrier liquid" was 5.0 g water). Based on more than ten kernel popping tests with aqueous salt solutions, the irradiation times for "first pop" ranged between 54 and 60 seconds and for MCT oil-coated kernels ranged between 45 and 50 seconds. Meanwhile, a 28 g sample of uncoated popcorn kernels in the silicone rubber popping vessel commenced popping after 48 seconds irradiation. Accordingly, these results indicated that MCT oils could be successfully used to pop V-PCKs in the microwave and negligibly affected the time required for kernels to begin popping. Surprisingly, the resultant popcorn did not exhibit scorching or burning, even though MCT oil has a smoke point well below the temperature required to cause the popping of the V-PCKs.

Example 28

The Effect of Salt on the Burning of MCT Oil-Coated Popcorn Kernels. In a first experiment, the use of no oil was compared to the use of MCT oil to heat virgin popcorn kernels (V-PCKs) in a microwave oven. In one sample, 1.8 g MCT oil was combined with 56 g V-PCKs. Another sample contained only 56 g V-PCKs. The mixtures were placed in the bottom of a temperature-resistant round-bottom silicone rubber popcorn popper vessel with a friction-fitted silicone rubber lid (the "PROPER POPPER"). The vessel was microwave-heated at full power (1250 watts) until about 50% of kernels were popped.

MCT oil coated unpopped kernels showed significant charring but uncoated unpopped kernels were uncharred. Thus, as expected based on the low smoke point of MCT oil, MCT oil charred on the kernels before popcorn kernels popped.

In a second experiment, the use of MCT oil was compared to the use of MCT oil and NaCl to heat virgin popcorn kernels (V-PCKs) in a microwave oven. In one sample, 1.8 g MCT oil was combined with 56 g of V-PCKs. In another sample, 1.5 g MCT oil was mixed with 1.0 g of NaCl and was combined with 56 g of V-PCKs. The mixtures were placed in the bottom of a temperature-resistant round-bottom silicone rubber popcorn popper vessel with a friction-fitted silicone rubber lid (the "PROPER POPPER"). The vessel was microwave-heated at full power in a microwave oven until about 50% of kernels were popped.

MCT oil coated unpopped kernels showed significant charring but MCT and NaCl coated unpopped kernels were uncharred. Thus, as expected based on the low smoke point of MCT oil, MCT oil charred on the kernels before popcorn kernels popped. However, unexpectedly, the addition of salt inhibited this charring.

In a third experiment, the use of MCT oil was compared to the use of MCT oil and NaCl to fully pop virgin popcorn kernels (V-PCKs) in a microwave oven. In one sample, 1.2 g of MCT oil was combined with 33 g of V-PCKs. In another sample, 1.2 g of MCT oil was mixed with 0.75 g of NaCl and was combined with 33 g of V-PCKs. The mixtures were placed in the bottom of a temperature-resistant round-bottom silicone rubber popcorn popper vessel with a friction-fitted silicone rubber lid (the "PROPER POPPER"). For both samples, the vessel was microwave-heated at full power in a microwave oven for 2 minutes and 30 seconds until more than 95% of kernels were popped.

MCT oil-coated popped kernels had a strong burnt smell and taste, and many of the popped kernels exhibited browning and burning and a gray discoloration of the normally white popcorn starch.

In contrast, the MCT oil and NaCl coated popped kernels were uncharred and did not smell or taste burnt. They did not exhibit browning and burning, nor any gray discoloration of the normally white popcorn starch. Rather, all of the popped kernels showed normal white popcorn starch.

Thus, as expected, MCT oil charred on the kernels before and after the popcorn kernels popped. However, unexpectedly, the addition of salt inhibited this charring.

Example 29

Medium Chain Triglyceride (MCT) Fluid Oil Carrier for Adding Salts and Flavorings to Popcorn Kernels During Microwave Irradiation. The MCT oil described in Example 27 (Neobee® M-5) was used as a carrier liquid for adding salts and flavors to popcorn kernels before they were popped. Accordingly, 1.8 g of this MCT liquid was added and combined with 56 g of Bob's Red Mill® white popcorn kernels forming a continuous glossy coating over the kernels. 0.80 g NaCl and 1.0 g KCl powders were separately combined and blended with 180 mg organic *Stevia* powder before adding and mixing with the MCT-coated kernels. The *Stevia* source was "365 BRAND" ORGANIC *STEVIA rebaudiana* powder prepared from organic *Stevia* leaves purchased from WHOLE FOODS MARKET. The resulting salt and sweetener-coated kernels were microwave-irradiated in the silicone rubber vessel (Example 5) in which popping commenced after 50 sec and ended after 2 min 20 sec. A small but visible amount of dried salt residue coated the bottom of the popper vessel. The popcorn puffs tasted uniformly well-salted and very sweet indicating that both the salts and the *Stevia* sweetener flavor has been successfully carried by the MCT oil coating and retained by the kernels without scorching or burning of the popcorn EXAMPLE 30

Improved Retention of Smaller Salt Particles in MCT Carrier by Popcorn During Microwave Irradiation. Example 28 was repeated with modest alterations as follows: 1.5 g of the same MCT oil was added and combined with 56 g of Bob's Red Mill® white popcorn kernels. 0.60 g NaCl and 0.75 g KCl powders were further reduced to an average particle size of between 200 and 300 microns using a mortar and pestle and then combined and mixed with the MCT-coated kernels that visibly appeared more evenly coated with the finer salt particles than those of Example 27. The coated kernels were similarly microwave-irradiated. Kernel popping commenced after 56 sec and ended after 2 min 40 sec with only 2 kernels remaining unpopped. A noticeable but reduced amount of dried salt residue was observed in the bottom of the vessel and the popcorn puffs tasted uniformly salted without scorching or burning of the popcorn. Thus, it appeared that salt particle size could influence salt adhesion.

Example 31

Increasing the Amount of MCT Fluid Carrier Increases the Retention of NaCl and KCl Salts by Popcorn Kernels During Microwave Irradiation. Example 29 was repeated but the amount of salt was increased to a constant level of 2.0 g (1.0 g NaCl+1.0 g KCl) per 56 g kernels for increased measuring sensitivity for salt retention by kernels. In this experiment the amount of fluid carrier MCT oil used to coat the kernels before adding the 2.0 g salt to the kernels was varied and increased stepwise (0 g, 0.5 g, 1.5 g and 3.0 g MCT oil) in a series of 4 controlled experiments to determine how salt retention would vary with the amount of MCT oil. In the first experiment 2.0 g mixed salt was combined with 56 g Bob's Red Mill® white popcorn kernels without having added MCT oil to the kernels. Popping began after 48 sec and ended after 2 min 13 sec. Without MCT oil, only 20% by weight of the salt was retained by the kernels based on subtracting the weight of salt residue in the silicone rubber popping vessel. In the second experiment, the 2.0 g salt was combined with the 56 g kernels after coating the kernels with 0.50 g MCT oil. Popping again began after 48 sec and ended after 2 min 24 sec. With only 0.5 g MCT oil, 50% by weight of the salt was retained by the kernels. Based on the levels of salt adherence reported on the Nutrition Labels of commercial palm oil containing microwave popcorn, was an unexpectedly high level of salt retention with an exceedingly low level of oil. In the third experiment, the 2.0 g salt was combined with the 56 g kernels after coating the kernels with 1.50 g MCT oil. Popping began after 46 sec and ended after 2 min 15 sec. With 1.5 g MCT oil, 62% by weight of the salt was retained by the kernels. Finally, in the fourth experiment, the 2.0 g salt was combined with the 56 g kernels after coating the kernels with 3.0 g MCT oil. Popping again began after 46 sec and ended after 2 min 18 sec. With 3.0 g MCT oil, 61% by weight of the salt was retained by the kernels. These results show that salt retention by popped kernels increases very substantially with increasing amounts of MCT carrier oil. However, this retention reached a plateau after adding an amount of MCT oil of approximately 1.5 g per 56 g of popcorn kernels. Surprisingly, the use of only 0.5 g of MCT oil provided over 80% of the salt retention as 1.5 g or 3.0 g of MCT. Thus, exceeding low levels of MCT oil could function as an effective carrier for salt adhesion during microwave popcorn popping without scorching or burning of the popcorn. The results are depicted in FIG. 1.

Example 32

Figure 2:
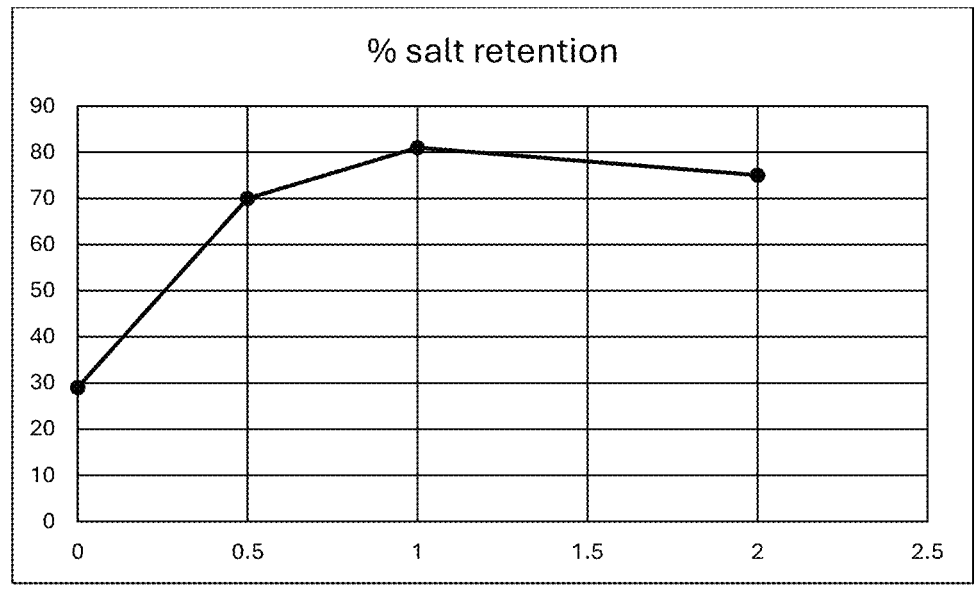
FIG. 2 depicts the increasing retention of salt with increasing amounts of MCT oil applied to popcorn kernels for salt particles ground and sieved to a smaller particle size (125 microns) than those salt particles in FIG. 1.

Decreasing the Salt Particle Size While Increasing the Amount of MCT Fluid Carrier Synergistically Act to Increase the Retention of Salts by Popcorn Kernels During Microwave Irradiation. Example 30 was substantially repeated while utilizing a substantially smaller salt particle size. A 50-50 by weight mixture of commercial granular NaCl and KCl salts was reduced in particle size from an average of approximately 400 microns to under 125 microns. For this purpose, mortar and pestle grinding was used followed by particle sieving through an 8 inch diameter 120 mesh stainless steel wire sieve that excludes particles larger than 125 microns (Hogentogler & Co., Inc.). The amount of salt applied to 56 g quantities of Bob's Red Mill® white popcorn kernels was maintained constant at 2.0 g (1.0 g NaCl+1.0 g KCl). In conducting four microwave oven kernel popping experiments, before adding the 2.0 g quantities of the 125 micron salt mixture to the kernels, increasing amounts of Neobee® M-5 MCT fluid carrier oil were applied as coatings to four 56 g samples of popcorn kernels as follows: 0.00 g MCT, 0.50 g MCT, 1.0 g MCT and 2.0 g MCT oil. In the first experiment the kernels alone were combined with 2.0 g salt. Popping began after 46 sec and ended after 2 min 17 sec. In the absence of MCT oil, 29% by weight of the input salt was retained by the kernels (based on subtracting 71% by weight of that input salt remaining as a residue in the silicone rubber vessel after kernel popping). In the second experiment, the kernels were coated with 0.50 g MCT oil before salting. Popping began after 47 sec and ended after 2 min 18 sec. With this 0.5 g quantity of MCT oil, surprisingly 70% by weight of the input salt was retained by the kernels (based on subtracting 30% by weight of the input salt remaining as a residue in the vessel after kernel popping). In the third experiment, the kernels were coated with 1.00 g MCT oil before salting. Popping began after 46 sec and ended after 2 min 22 sec. With this 1.00 g quantity of MCT oil, remarkably 81% by weight of the input salt was retained by the kernels (based on subtracting 19% by weight of the input salt remaining as a residue in the vessel after kernel popping). In the fourth and final experiment, the kernels were coated with 2.00 g MCT oil before salting. Popping began after 45 sec and ended after 2 min 20 sec. With this 2.00 g quantity of MCT oil, a similar but slightly reduced proportion of the input salt, i.e., 75% by weight salt, was retained by the kernels (based on subtracting 25% by weight of the input salt remaining as a residue in the vessel after kernel popping). In this last experiment, an oil film inside the popping vessel was visible following kernel popping. The presence of free oil suggests that the 2.00 g level of MCT oil had exceeded that amount required for maximizing salt retention for a 56 g quantity of these popcorn kernels. Surprisingly, the use of only 0.5 g of MCT oil provided over 87% of the salt retention as 1.0 g or 2.0 g of MCT. Thus, exceeding low levels of MCT oil could function as an effective carrier for salt adhesion during microwave popcorn popping without scorching or burning of the popcorn. The results are depicted in FIG. 2.

The results from this experiment indicate that salt retention by popcorn kernels during microwave irradiation can be increased and optimized: (1) by adjusting the amount of MCT oil for a given quantity of popcorn kernels and (2) by reducing and controlling the salt particle size.

By comparison, an MCT oil with its beneficially shorter carbon chain of saturated fatty acids compared to palm oil (8 and 10 carbons versus 16 and 18 carbons) provides a hydrophobic, moisture-free, moisture-excluding, and chemically stabilizing environment for coating popcorn kernels. An MCT oil can also efficiently carry salts, flavors and sweeteners and will stabilize other food additives and food ingredients such as cheese powders for example, being added to some microwave popcorns. In addition, MCT oils are able to form thin liquid coatings around popcorn kernels compared to much thicker solid coatings formed by palm oil around such kernels. This difference in coatings translates to far fewer fat calories for MCT oil compared to palm fat-coated popcorn kernels. Furthermore, the longer chain saturated fatty acids of palm oil are cholesterolemic and may contribute to health problems whereas the C8:0 and C10:0 shorter chain saturated fatty acids of MCT oils are non-cholesterolemic and tend to be rapidly metabolized for energy in the human body. Therefore, as a carrier that enables a high level of retention of salts and other additives by popcorn kernels being microwave-irradiated, MCT oil holds a clear advantage over conventional salt carriers such as palm oil and can surprisingly be used without scorching or burning of the popcorn.

Example 33

Storage Stability of V-PCKs in Salted MCT Oil. The effect of long-term storage of V-PCKs in MCT oil has not previously been determined. To test whether the presence of MCT oil and salt would compromise the structure of the V-PCKs during long term storage and reduce their ability to be popped, samples were stored in MCT oil and salt for two weeks. Three identical samples of Bob's Red Mill® white popcorn kernels (56 g each) were placed half pint glass jars. One sample (sample C) was sealed and stored as the "control". The other two samples (A and B) were each mixed and thoroughly coated with 1.0 g of Neobee® M-5 MCT oil before being further mixed with 2.0 g of a 50-50 by weight mixture of NaCl and KCl salts that had been reduced in particle size to under 125 microns using a 120 mesh sieve. The jar of sample A was sealed while sample B was supplemented and mixed with approximately 45 mg *Stevia* powder before sealing its jar. After a two week interval of storage at ambient temperature, the three samples were each popped in the silicone rubber vessel using the microwave oven described in the above examples. All samples commenced popping after 50-55 seconds had elapsed, and completed popping after 138-146 seconds had elapsed. Total measured volumes of popped, loosely packed kernels were as follows: (A) 2.25 liters, (B) 2.20 liters, and (C) 2.20 liters for the "control" kernels lacking MCT oil and salt. The number of unpopped kernels averaged approximately 27 kernels per sample, and nearly all the unpopped kernels from the three samples subsequently popped with 2 minutes of additional microwave heating in the same popper vessel. The nearly identical popping times and the nearly equal volumes of popped kernels for the three samples indicate that neither the presence of MCT oil nor salt compromised the structure of the V-PCKs during their storage.

One additional sample (56 g of the same popcorn kernels described above) was similarly prepared and stored at ambient temperature for the same two week interval. The kernels included 1.5 g rather than 1.0 g of the same M-5 MCT oil. These kernels also included a somewhat reduced amount of a mixed powdered salt (i.e., 0.60 g NaCl and 0.75 g KCl compared to 2.0 g of a 1:1 mixture). Interestingly, this two week old coated kernel sample showed a visible sheen from free MCT oil that was lacking in samples A and B above.

Furthermore, after popping and removing these kernels (producing 2.1 liters loosely packed popcorn), the bottom interior surface of the popping vessel revealed a shiny film of free MCT oil. The presence of free MCT oil differed and contrasted with sparse dry coatings of salt particles observed at the bottom of the silicone vessel after popping samples A and B above. These observations taken together with the data provided in FIGS. 1 and 2 suggest that the optimum (or minimum but sufficient) amount of MCT oil required for maximizing salt retention by microwave popcorn should be empirically determined. This determination will almost certainly depend on some or all of the following variables: the amount of popcorn being popped, the popcorn varietal and kernel size, the selected salt or its chemical blend (e.g., NaCl+KCl and/or additives such as sweeteners and flavorants), the weight ratio of salt to popcorn kernels, and the salt particle size. For MCT oils containing principally C8:0 and C10:0 esterified fatty acids, it is unlikely that minor differences among the viscosities of individual MCT oils will alter this determination.

Example 34

Slurry of Salted MCT Oil. A slurry was made with 1.5 g MCT oil with 1 g of extra fine 200 mesh NaCl (Morton International, Chicago). The salt was fully wetted after mixing with the MCT oil, and the resulting slurry was free-flowing and glossy. The slurry was then combined and stirred with 56 g BOB's RED MILL V-PCKs. The kernels were well coated and glossy. Microwave popping resulted in a nearly complete lack of residual salt in the popper, demonstrating nearly complete salt adhesion to the popped kernels. In contrast, a test performed without any MCT oil showed a nearly complete lack of adhesion of the salt to the popped kernels.

Example 35

Shelf Life of V-PCKs Coated with Slurry of MCT Oil and Salt Prior to Microwave Popping. A slurry similar to that described in Example 34 was made using 2.25 g MCT oil and 1.5 g of extra fine 200 mesh NaCl (Morton International, Chicago). The slurry was combined and thoroughly mixed together with 3 oz (84 g) YODER POPCORN V-PCKs ("Tiny Tender" white popcorn) until the kernels were uniformly slurry-coated. These kernels were then placed and sealed inside a 4 fluid oz glass jar and stored at room temperature for 4.5 months. The kernels were then transferred to a PROPER POPPER microwave popcorn popping vessel and irradiated at full power as described in Example 5. Kernel popping ceased after approximately 2 min 18 sec of microwave heating. 23 kernels remaining unpopped (3%) out of a total of approximately 760 kernels (84 g). No burning was detected. Upon removal of the popped kernels from the vessel there was no visible salt residue or MCT oil in the popping vessel indicating full and effective transfer of the salt and oil to the popped kernels. This Example demonstrates that MCT oil and salt-coated popcorn kernels can be stored for multiple months at room temperature and maintain their ability to be popped in a microwave oven.

A slurry similar to that described in Example 34 was made using 2.25 g MCT oil and 1.5 g of extra fine 200 mesh NaCl (Morton International, Chicago). The slurry was combined and thoroughly mixed together with 3 oz (84 g) YODER POPCORN V-PCKs ("Tiny Tender" white popcorn) until the kernels were uniformly slurry-coated. These kernels were then placed and sealed inside a 4 fluid oz glass jar and stored at room temperature for 14 months. The kernels were then transferred to a PROPER POPPER microwave popcorn popping vessel and irradiated at full power as described in Example 5. Kernel popping ceased after approximately 2 min 8 sec of microwave heating. 32 kernels remaining unpopped (4%) out of a total of approximately 760 kernels (84 g). No burning was detected. Upon removal of the popped kernels from the vessel there was no visible salt residue or MCT oil in the popping vessel indicating full and effective transfer of the salt and oil to the popped kernels. This Example demonstrates that MCT oil and salt-coated popcorn kernels can be stored for more than one year at room temperature and maintain their ability to be popped in a microwave oven. The popcorn also tasted fresh.

Kernel popping ceased after approximately 2 min 52 sec of microwave heating. 22 kernels remaining unpopped out of a total of approximately 760 kernels (84 g).

Example 36

A Small Amount of Salt with Wide Range of Ratios of MCT Oil:Salt Prevent Burning of Popcorn. The following experiment was performed with varying ratios of MCT oil:salt using 56 g quantities of Bob's Red Mill® white popcorn kernels coated with 0.5 g of 125 micron NaCl and 2 g, 4 g, 8 g, or 16 g of Neobee® M-5 MCT fluid. The microwave was set at 3:00 minutes at full power (1250 watts) and the time when the popcorn first started popping and when the microwaving was stopped were recorded. The numbers of unpopped kernels were also recorded.

The results are presented in the Table below:

Using ~1% salt, no scorching was seen with a ratio of 4:1, 8:1, or 16:1 MCT oil:salt. However, moderate scorching of both the popped and residual unpopped kernels was seen at a ratio of 32:1 MCT oil:salt.

Together with other experiments performed above with lower levels of MCT oil, these results demonstrate that a wide range of amounts and ratios of salt:MCT oil may be used successfully to pop popcorn in a microwave oven (from a 1:16 ratio to a 4:1 ratio). Various experiments also used a wide range of amounts of MCT oil (0.5 g-16 g) and ratios of popcorn:MCT oil (from a 112:1 ratio to a 3.5:1 ratio) with 56 g of kernels. Over these ranges, no burning was observed. Thus, the popcorn-MCT oil-salt combination of can be used successfully in a microwave oven over a wide range of ratios and amounts. The presence of salt can prevent popcorn from scorching.

Example 36

A Fat-Based Thickener Can Be Used to Solidify an Otherwise Fluid MCT Oil. A thickener was added to a slurry containing MCT oil and salt (e.g., 1.8 g MCT oil and 1.00 g of 200 mesh Morton's NaCl powder and 56 g popcorn kernels) where an added thickener enabled the slurry to maintain a generally uniform solid or semi-solid coating around the popcorn kernels until the mixture of kernels and slurry was microwaved to cause popping. Successful coatings were produced by adding, heating, and melting together between about 10% and 15% by weight of either a palm oil structuring fat (PALMES 63, Product Code FM-0068, Fuji Vegetable Oil, Inc., Savannah, GA) or a monoglyceride-based fat (Drewmulse 200K FLAKE, Stepan Company Northbrook, IL) that were combined with a MCT oil+salt slurry and then all combined together with the popcorn kernels.

I claim:

1. A composition comprising:
   a) at least 70% virgin popcorn kernels (V-PCKs) by weight;
   b) 1-28% medium chain triglyceride (MCT) oil by weight, wherein esterified fatty acid chains of the MCT oil are at least 75% C8:0 (Caprylic acid) and/or C10:0 (Capric acid) by weight of said esterified fatty acid chains of the MCT oil; and
   c) 0.5-4% salt by weight, wherein the salt is selected from sodium chloride (NaCl) and potassium chloride (KCl) at a weight ratio of the salt:the MCT oil from 1:16 to 4:1;
   wherein the composition contains at least 97% by weight of the V-PCKs, the MCT oil, and the salt.

2. The composition of claim 1, consisting of the V-PCKs, the MCT oil, and the salt.

3. The composition of claim 1, wherein the composition contains at least 98% by weight of the V-PCKs, the MCT oil, and the salt.

| V-PCKs | Salt | MCT Oil | Popping Started | Popping Stopped | Unpopped Kernels | Unopped Kernels | Popped Kernels |
|--------|------|---------|-----------------|-----------------|------------------|-----------------|----------------|
| 56 g | 0.5 g | 2 g | 1:53 | :32 | 11 | No scorching | No scorching |
| 56 g | 0.5 g | 4 g | 2:03 | :52 | 19 | No scorching | No scorching |
| 56 g | 0.5 g | 8 g | 2:03 | :48 | 20 | No scorching | No scorching |
| 56 g | 0.5 g | 16 g | 1:55 | :45 | 26 | Moderate scorching | Moderate scorching |

4. The composition of claim 1, wherein the composition contains at least 99% by weight of the V-PCKs, the MCT oil, and the salt.

5. The composition of claim 1, comprising:

a) 70-80% of the V-PCKs by weight;

b) 14-28% of the MCT oil by weight; and c) 0.5-4% of the salt by weight at a weight ratio of the salt:the MCT oil from 1:16 to 4:1;

and contains at least 98% by weight of the V-PCKs, the MCT oil, and the salt.

6. The composition of claim 1, comprising:

a) 80-90% of the V-PCKs by weight;

b) 4-18% of the MCT oil by weight; and c) 0.5-4% of the salt by weight at a weight ratio of the salt:the MCT oil from 1:16 to 4:1;

and contains at least 98% by weight of the V-PCKs, the MCT oil, and the salt.

7. The composition of claim 1, comprising:

a) 75-85% of the V-PCKs by weight;

b) 9-14% of the MCT oil by weight; and c) 0.5-4% of the salt by weight at a weight ratio of the salt:the MCT oil from 1:16 to 4:1;

and contains at least 98% by weight of the V-PCKs, the MCT oil, and the salt.

8. The composition of claim 1, comprising:

a) 90-95% of the V-PCKs by weight;

b) 0.5-4.5% of the MCT oil by weight; and c) 0.5-4% of the salt by weight at a weight ratio of the salt:the MCT oil from 1:16 to 4:1;

and contains at least 98% by weight of the V-PCKs, the MCT oil, the and salt.

9. The composition of claim 1, wherein the salt is the sodium chloride (NaCl).

10. The composition of claim 1, wherein the salt is a mixture of the potassium chloride (KCl) and the sodium chloride (NaCl).

11. The composition of claim 1, wherein the salt is a 1:1 mixture by weight of the KCl and the NaCl.

12. The composition of claim 1, wherein the composition comprises 0.5-2% of the salt by weight.

13. The composition of claim 1, wherein the composition comprises 2-4% of the salt by weight.

14. The composition of claim 1, wherein the composition comprises 1-4% of the MCT oil by weight.

15. The composition of claim 1, wherein the composition comprises 1-6% of the MCT oil by weight.

16. The composition of claim 1, wherein the composition comprises 6-28% of the MCT oil by weight.

17. The composition of claim 1, wherein the composition further comprises a flavoring.

18. The composition of claim 1, wherein the composition further comprises a thickener.

19. The composition of claim 1, wherein the composition is in a microwave popcorn popping bag.

* * * * *